(12) United States Patent
VanDenberg

(10) Patent No.: US 6,796,566 B2
(45) Date of Patent: Sep. 28, 2004

(54) LIFT AXLE SUSPENSION SYSTEM UTILIZING DIAPHRAGM CHAMBERS

(75) Inventor: Ervin K. VanDenberg, Massillon, OH (US)

(73) Assignee: Suspension Technology, Inc., Canton, OH (US)

( * ) Notice: Subject to any disclaimer, the term of this patent is extended or adjusted under 35 U.S.C. 154(b) by 300 days.

(21) Appl. No.: 10/017,823

(22) Filed: Dec. 7, 2001

(65) Prior Publication Data

US 2003/0107198 A1 Jun. 12, 2003

(51) Int. Cl.[7] ................................................. B60G 9/04
(52) U.S. Cl. ............................. 280/86.5; 280/124.128; 280/124.153; 280/124.16
(58) Field of Search ......................... 280/86.5, 124.153, 280/124.157, 124.158, 124.159, 124.16, 124.161

(56) References Cited

U.S. PATENT DOCUMENTS

| | | | |
|---|---|---|---|
| 2,052,309 A | * | 8/1936 | Kovach ...................... 267/250 |
| 2,644,697 A | | 7/1953 | Peterson |
| 2,674,463 A | | 4/1954 | Peterson |
| 2,674,464 A | | 4/1954 | Peterson |
| 3,002,763 A | | 10/1961 | Beck et al. |
| 3,063,703 A | | 11/1962 | Harbers et al. |
| 3,177,004 A | | 4/1965 | Schmidt |
| 3,186,733 A | | 6/1965 | Langehennig |
| 3,191,964 A | | 6/1965 | Chambers |
| 3,325,181 A | | 6/1967 | Granning |
| 3,390,395 A | | 6/1968 | Verdi |
| 3,447,813 A | | 6/1969 | Wolf |
| 3,448,975 A | | 6/1969 | Verdi |
| 3,572,624 A | | 3/1971 | Holdampf et al. |
| 3,617,072 A | | 11/1971 | Turner, Jr. |
| 3,704,896 A | | 12/1972 | Buelow |
| 3,716,249 A | | 2/1973 | Schaeff |
| 3,730,549 A | | 5/1973 | Turner, Jr, |
| 3,738,679 A | | 6/1973 | Jackson |
| 3,751,066 A | | 8/1973 | Narahari |
| 3,771,812 A | | 11/1973 | Pierce et al. |
| 3,861,708 A | | 1/1975 | Fier |
| 3,912,293 A | | 10/1975 | Harbers |
| 4,084,833 A | | 4/1978 | Mohrbacker et al. |
| 4,089,544 A | | 5/1978 | Raidel |
| 4,095,450 A | | 6/1978 | Opland et al. |
| 4,102,424 A | | 7/1978 | Heinze |
| 4,134,604 A | | 1/1979 | Jackson |
| 4,157,188 A | | 6/1979 | Sims |
| 4,165,884 A | | 8/1979 | Allison et al. |
| 4,171,830 A | | 10/1979 | Metz |
| 4,195,856 A | | 4/1980 | Larson et al. |
| 4,208,063 A | | 6/1980 | Baker et al. |
| 4,262,929 A | | 4/1981 | Pierce |
| 4,293,145 A | | 10/1981 | Taylor |
| 4,300,787 A | | 11/1981 | VanDenberg |
| 4,314,709 A | | 2/1982 | Silbernagel |

(List continued on next page.)

Primary Examiner—Paul N. Dickson
Assistant Examiner—Deanna Draper
(74) Attorney, Agent, or Firm—Sand & Sebolt

(57) ABSTRACT

A lift axle suspension system to be mounted under a vehicle for selectively raising a tire wheel assembly out of engagement with a road surface which vehicle includes a lift axle mounted to a hanger bracket via a pivot connector. The hanger bracket is rigidly attached to a vehicle frame and has articulating arms pivotally connected thereto. These arms connect at their opposite ends to the axle. A pair of diaphragm chambers such as brake chambers each include upper and lower chambers separated by a flexible bladder that moves under pressurization causing a push rod affixed thereto to translate. The diaphragm chambers and push rods extending therefrom are connected in different embodiments to the hanger bracket or other rigid structures as well as the articulating arm such that movement of the push rods causes movement of the articulating arms and thus movement such as lifting of the axle.

39 Claims, 27 Drawing Sheets

U.S. PATENT DOCUMENTS

| | | | |
|---|---|---|---|
| 4,373,738 A | | 2/1983 | Lange |
| 4,451,052 A | | 5/1984 | Gagelin |
| 4,497,507 A | | 2/1985 | Chervenak |
| 4,504,080 A | | 3/1985 | VanDenberg |
| 4,506,908 A | | 3/1985 | Harle |
| 4,506,910 A | | 3/1985 | Bierens |
| 4,573,704 A | | 3/1986 | VanDenberg et al. |
| 4,634,141 A | | 1/1987 | Hagan et al. |
| 4,684,142 A | | 8/1987 | Christenson |
| 4,705,133 A | | 11/1987 | Christenson et al. |
| 4,729,579 A | | 3/1988 | Hagan et al. |
| 4,762,421 A | | 8/1988 | Christenson et al. |
| 4,770,430 A | | 9/1988 | Lange |
| 4,773,670 A | * | 9/1988 | Raidel, II .................. 280/86.5 |
| 4,783,096 A | | 11/1988 | Ramsey et al. |
| 4,786,114 A | | 11/1988 | Steiner et al. |
| 4,802,690 A | | 2/1989 | Raidel |
| 4,848,783 A | | 7/1989 | Christenson et al. |
| 4,881,747 A | | 11/1989 | Raidel |
| 4,889,361 A | | 12/1989 | Booher |
| 4,893,832 A | | 1/1990 | Booher |
| 4,938,494 A | | 7/1990 | Takahashi et al. |
| 5,015,004 A | | 5/1991 | Mitchell |
| 5,018,755 A | | 5/1991 | McNeilus et al. |
| 5,018,756 A | | 5/1991 | Mitchell |
| 5,058,917 A | * | 10/1991 | Richardson ................ 280/86.5 |
| 5,090,495 A | | 2/1992 | Christenson |
| 5,230,528 A | | 7/1993 | Van Raden et al. |
| 5,403,031 A | | 4/1995 | Gottschalk et al. |
| 5,505,481 A | | 4/1996 | VanDenberg et al. |
| 5,505,482 A | | 4/1996 | VanDenberg |
| 5,540,454 A | | 7/1996 | VanDenberg et al. |
| 5,620,194 A | * | 4/1997 | Keeler et al. ............... 280/81.6 |
| 5,683,098 A | | 11/1997 | VanDenberg |
| 5,690,353 A | | 11/1997 | VanDenberg |
| 5,718,445 A | | 2/1998 | VanDenberg |
| 5,778,798 A | * | 7/1998 | VanDenberg ............. 105/215.2 |
| 5,785,345 A | * | 7/1998 | Barlas et al. ......... 280/124.165 |
| 5,788,263 A | | 8/1998 | VanDenberg |
| 5,816,605 A | | 10/1998 | Raidel, Sr. |
| 5,820,156 A | | 10/1998 | VanDenberg |
| 5,853,183 A | | 12/1998 | VanDenberg |
| 6,007,078 A | | 12/1999 | Gottschalk et al. |
| 6,062,578 A | * | 5/2000 | Richardson ................ 280/81.6 |
| 6,073,946 A | * | 6/2000 | Richardson ................ 280/86.5 |
| 6,092,819 A | * | 7/2000 | Overby et al. ......... 280/124.153 |
| 6,123,347 A | * | 9/2000 | Christenson ............... 280/86.5 |
| 6,158,750 A | * | 12/2000 | Gideon et al. ............. 280/86.5 |

* cited by examiner

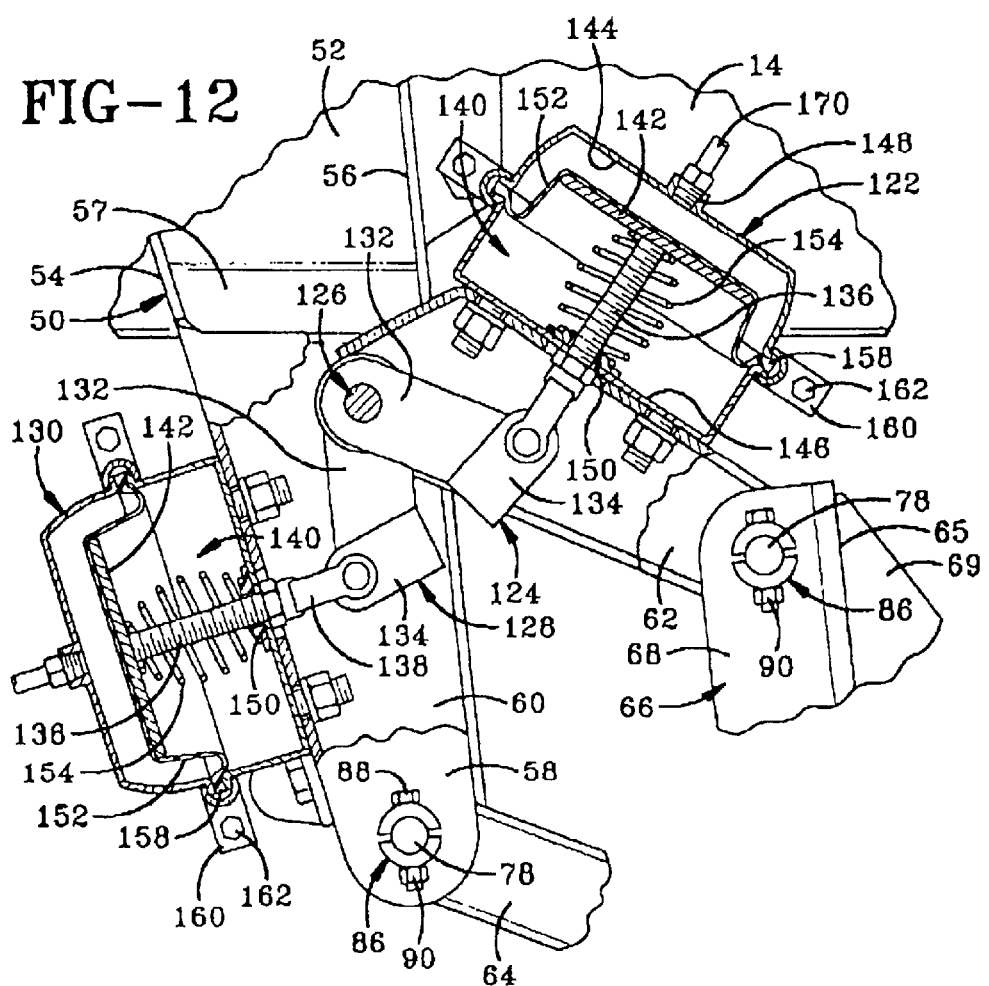
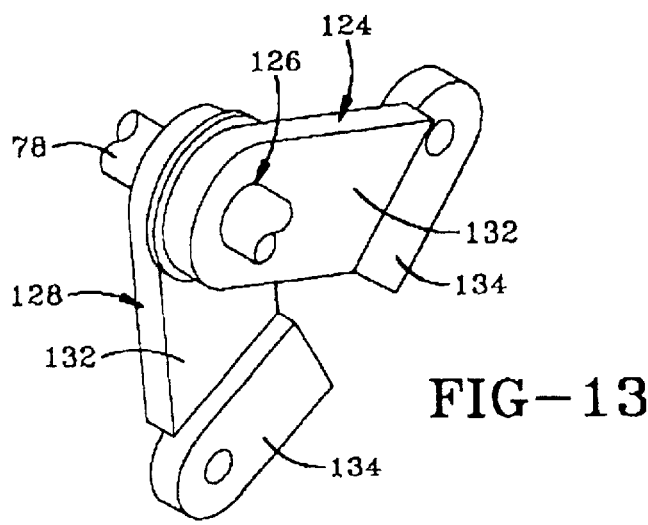

US 6,796,566 B2

LIFT AXLE SUSPENSION SYSTEM UTILIZING DIAPHRAGM CHAMBERS

BACKGROUND OF THE INVENTION

1. Technical Field

The invention relates generally to axle suspensions for wheeled vehicles. More particularly, the invention relates to lift axle suspension systems for add-on axles. Specifically, the invention relates to lift axle suspension systems utilizing diaphragm chambers for selectively raising the wheels of a vehicle out of engagement with the road surface.

2. Background Information

Following World War II was the advent of large load-carrying capacity vehicles such as trucks and trailers. In the decades that followed, these vehicles rapidly ascended in popularity. Additionally, over the past decade or so, there has been a dramatic increase in the sale of pickup style trucks and sport utility vehicles resulting in a much broader range of people having vehicles with the capacity to pull light and medium duty trailers. With the advent and the continued demand for these large load carrying capacity trucks and trailers, and with the newer demand for light and medium duty trailers, came the need to provide add-on axles, for increasing the capacity of trucks and/or trailers which were manufactured with a limited number of axles.

While add-on axles effectively increased carrying capacity, it was soon realized that as the number of load bearing axles increased on a given vehicle, a number of difficulties arose. Specifically, tire scuffing, loss in fuel economy and the inability to safely corner, all were problems associated with add-on type axles. Mitigation of these problems was of primary concern to the industry, which concern resulted in the development of the lift axle suspension system. Such a suspension system could be selectively raised from the road surface or lowered into engagement with the road surface when needed, thereby mitigating the aforementioned problems.

Many types and varieties of lift axle suspensions or similar suspension systems have been designed and employed since their inception with varying degrees of success or failure. Two commonly used and industry accepted styles are the leading and trailing beam type and the parallelogram type, any of which may utilize either mechanical springs, torsion tubes, air springs and or a combination of these.

Among the most successful are those of the parallelogram air-powered lift type produced for example by Rockwell International. Another type is the upwardly biased leaf spring produced by Turner Quick-Lift Corporation of Canton, Ohio, such as disclosed in U.S. Pat. No. 3,185,621. Both of these types of units have the advantage of being safe, durable, effective for their intended purpose, useful in both the pusher (forward of the drive axle), and tag (rearward of the drive axle) positions and on both truck chassis and trailers alike.

While these and many other types of lift axle suspensions have operated effectively and solved an important need in the art, each of the designs is different resulting in a multitude of different design configurations, parts, methods of operation, functionality variations, etc. These known designs generally incorporate the use of leaf springs, other biased springs, or air springs or the like such as air bladders, air or lift bellows or other similar pressurizable devices, all of which have a number of drawbacks. Specifically, air springs are often complicated, expensive, difficult to use, difficult to maintain, bulky, and of many varying designs. Leaf springs or other biasable springs have other well known drawbacks. As a result, a failure or malfunction of a lift axle suspension in the field may result in significant downtime for the vehicle based upon a number of factors including: the need for a trained mechanic for that particular lift axle style or at least the air spring style that is thereon, and the need for repair or replacement parts that must often be ordered due to the specific nature of the parts to a specific air spring design. Both of these issues tend to make a repair, even one of a simple nature, a time consuming, and sometimes labor intensive and costly event.

Therefore, the need exists for a lift axle suspension system wherein standard, interchangeable, cost effective, readily available parts are integrated therein, and that most if not all mechanics in the truck maintenance field are capable and qualified to perform maintenance and repair thereon. Moreover, a need exists for such a lift axle suspension system where the new design simplifies or at least does not further complicate the overall suspension design. Still further, the need exists for such a lift axle suspension system which incorporates existing vehicle parts used on other systems on the vehicle, and thus readily understood, available, and interchangeable.

BRIEF SUMMARY OF THE INVENTION

Objectives of the invention include providing an improved lift axle suspension system.

A further objective includes providing an improved lift axle suspension system in which the suspension system utilizes diaphragm chambers as part of the extensible and retractable lift mechanism in lieu of air springs or the like.

Another objective of the invention is to provide such a lift axle suspension system in which the suspension system utilizes diaphragm chambers embodied as brake chambers as part of the extensible and retractable lift mechanism in lieu of air springs or the like.

A further objective of the invention is to provide such a lift axle suspension system which is of simple construction, which achieves the stated objectives in a simple, effective and inexpensive manner, and which solves problems and satisfies needs existing in the art.

These and other objectives and advantages of the invention are obtained by the improved lift axle suspension system for selectively raising and lowering a vehicle or vehicle trailer's tires into and out of engagement with a road surface, the general nature of which may be stated as including a mounting bracket rigidly affixed to a longitudinally extending frame member on the vehicle, a first and a second articulating arm each having first and second ends, the first end of each articulating arm being pivotally attached to the mounting bracket, and the second end of each articulating arm being pivotally attached to the axle, and at least one diaphragm chamber having a movable wall therein dividing the diaphragm chamber into an upper chamber and a lower chamber, and a push rod extending therefrom and translatable when the movable wall is moved whereby the push rod is interconnected to the lift axle suspension system in a manner such that translation of the push rod causes pivotal movement of the articulating arms and axle attached thereto.

BRIEF DESCRIPTION OF THE SEVERAL VIEWS OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

FIG. 12 is an enlarged fragmentary view of the diaphragm chambers and connecting linkage plus surrounding lift suspension parts of FIG. 12 with the diaphragm chambers shown in section;

FIG. 13 is an isometric view of the linkage connecting the diaphragm chambers as best shown in FIG. 12;

DETAILED DESCRIPTION OF THE INVENTION

Figure 1:
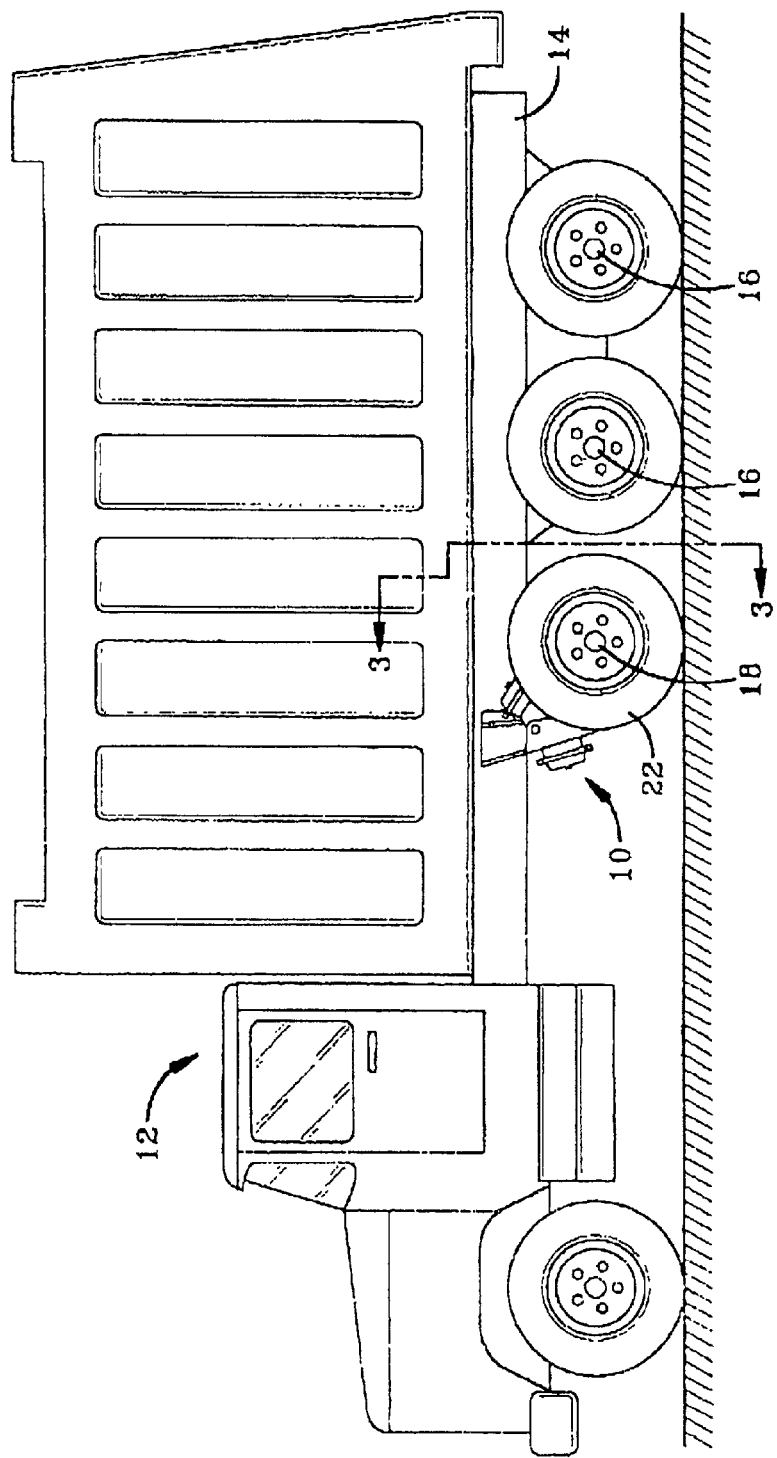
FIG. 1 is a side elevational view of a first embodiment of the lift axle suspension system of the present invention shown in combination with a vehicle.

The improved lift axle suspension system of the present invention is shown in four embodiments in the Figures although other embodiments are contemplated as is apparent to one of skill in the art. Specifically, the first embodiment of the lift axle suspension system indicated generally at 10 is mounted on a vehicle 12 having a pair of frame rails 14 as shown in FIG. 1. Multiple axles 16 are attached to the vehicle as is well known in the art. Additionally, a lift axle 18 is attached to vehicle 12 via lift axle suspension system as shown in FIGS. 1, 3–4, 19, 23 and 27 and described in more detail below. At each end of lift axle 18 is a caster 20 that pivotally connects a tire-wheel assembly 22 to the axle 18.

Figure 2:
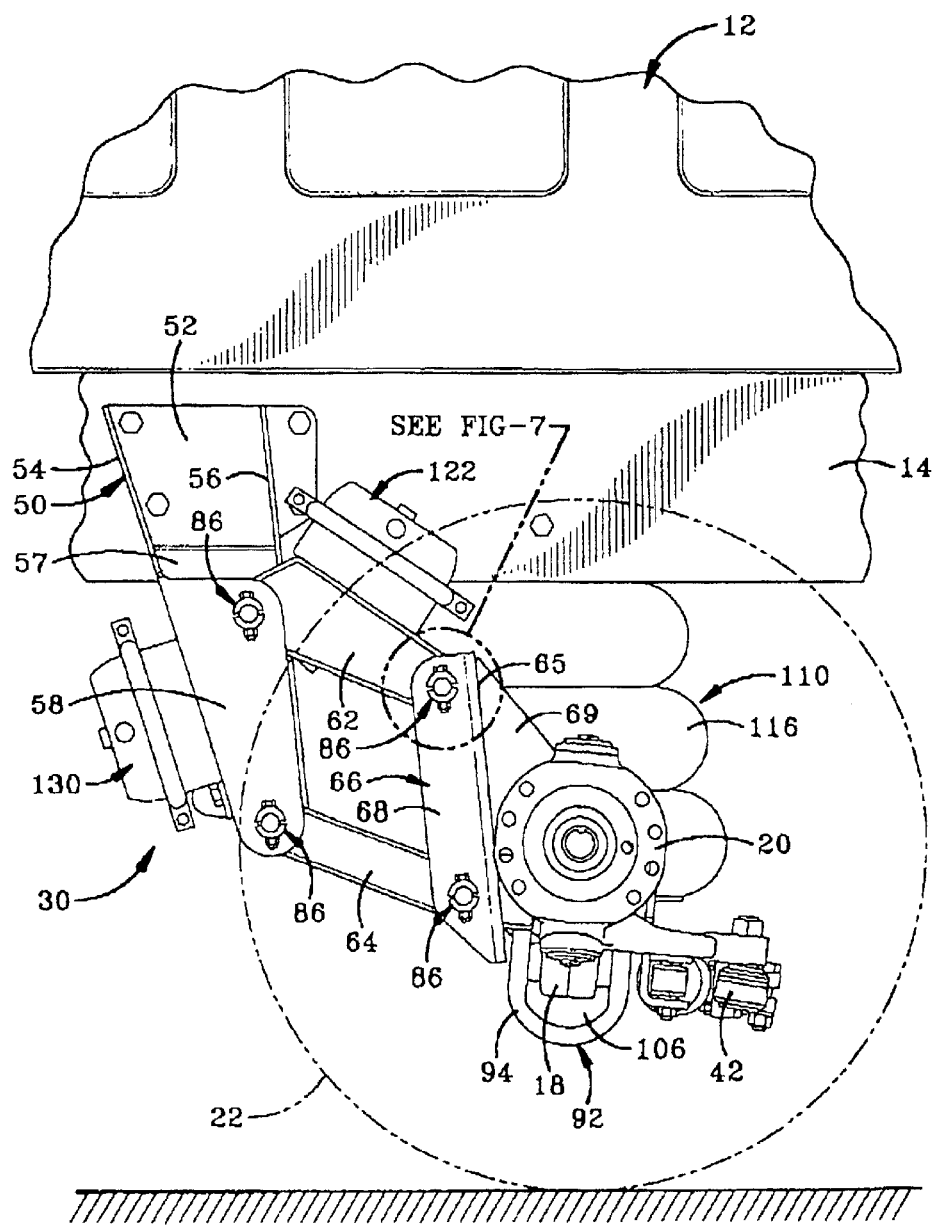
FIG. 2 is a fragmentary side elevational view of the first embodiment of the lift axle suspension system shown in FIG. 1 with portions of the vehicle broken away and the vehicle tire adjacent to the system removed and shown in hidden lines.
Figure 3:
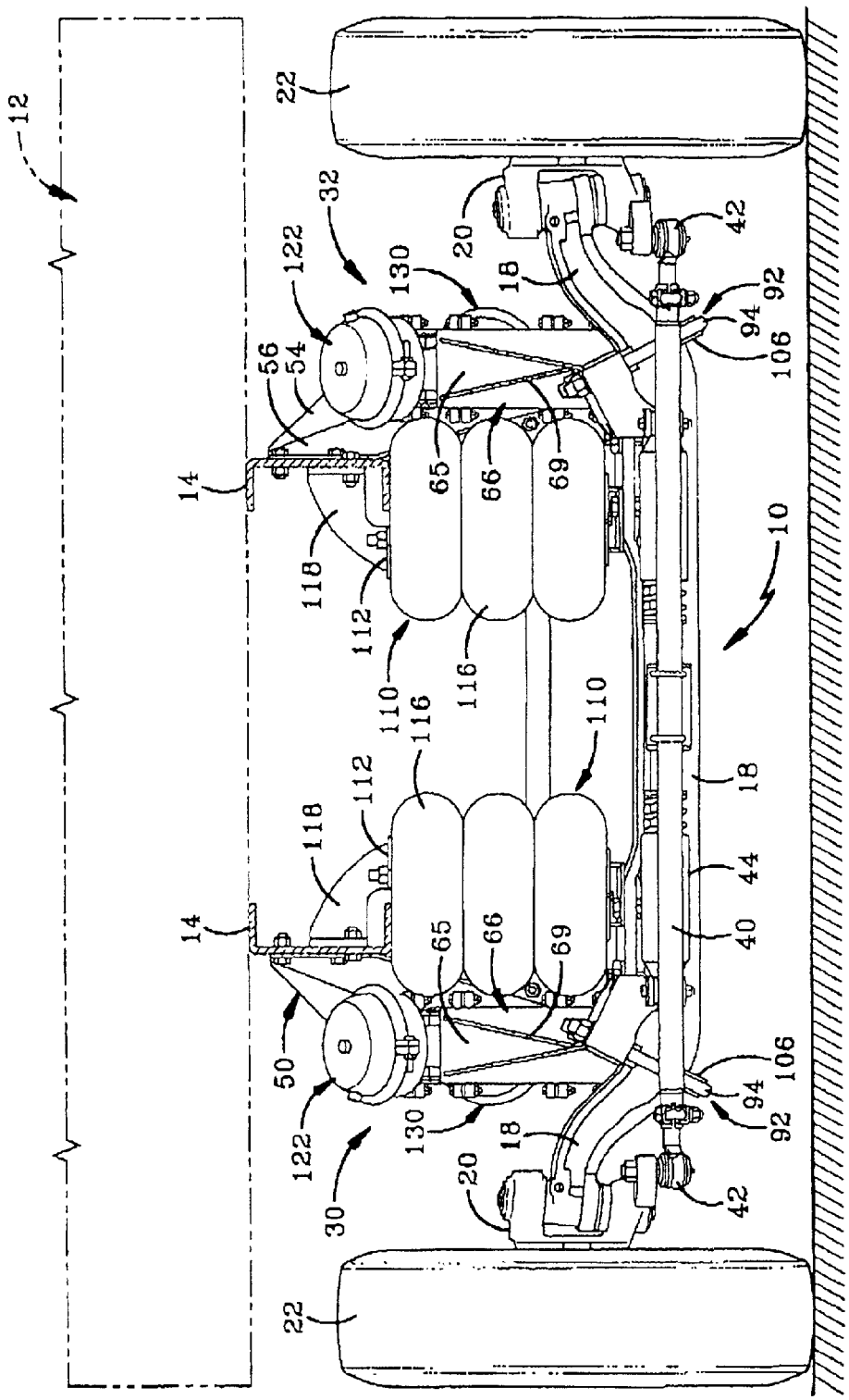
FIG. 3 is a rear elevational view of one side of the first embodiment of the lift axle suspension taken along line 3—3 of FIG. 1 with the vehicle broken away and shown in hidden lines.

Lift axle suspension system 10 includes a pair of suspension assemblies joined by axle 18 and indicated generally at 30 and 32 in FIG. 3. Since the assemblies are similar to each other where one is a mirror image of the other, only one 30 is shown in FIGS. 2 and 4–18 and discussed below.

As is known in the art, lift axle suspension 10 may include a tie rod 40 that is connected between a pair of stabilizer brackets 42 that are directly connected in this embodiment to caster 20 in each wheel assembly. A steering dampener 44 as is known in the art for dampening lateral motion from the tire-wheel assemblies 22 is also present and functions in conjunction with the tie rod as is well known in the art.

Figure 6:
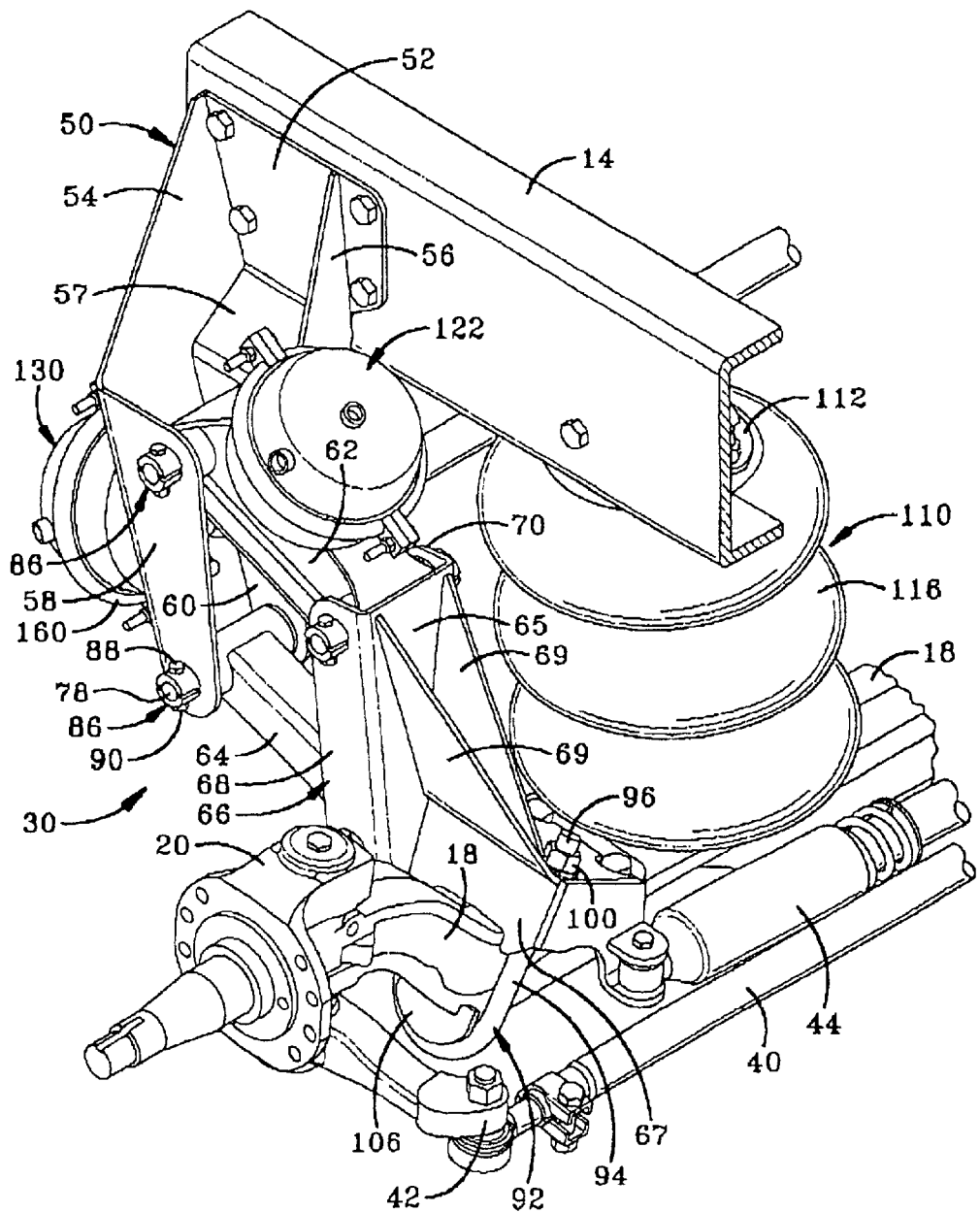
FIG. 6 is an isometric view of the first embodiment of the lift axle suspension system of FIG. 4 with the portions of the vehicle and tire removed.

Suspension assembly 30 includes a mounting bracket 50 that is rigidly affixed to frame rail 14. Mounting bracket 50 includes a mounting portion 52 through which the bracket is welded, bolted or otherwise affixed to the frame rail 14, a pair of spaced apart intermediate portions 54 and 56, and a pair of spaced apart hanger portions 58 and 60. The intermediate portions extend outward from the mounting portion as shown in FIGS. 2, 3 and 6, whereby hanger portion 58 extends transversely from an outermost edge of intermediate portion 54 while hanger portion 60 extends transversely from a mid-portion of intermediate portion 54 and is attached to an outermost edge of intermediate portion 56. A reinforcing plate 57 may connect hanger portion 60, intermediate portions 54 and 56, and mounting portion 52. Other reinforcements or rigidity structures may also be present as is well known in the art.

Figure 7:
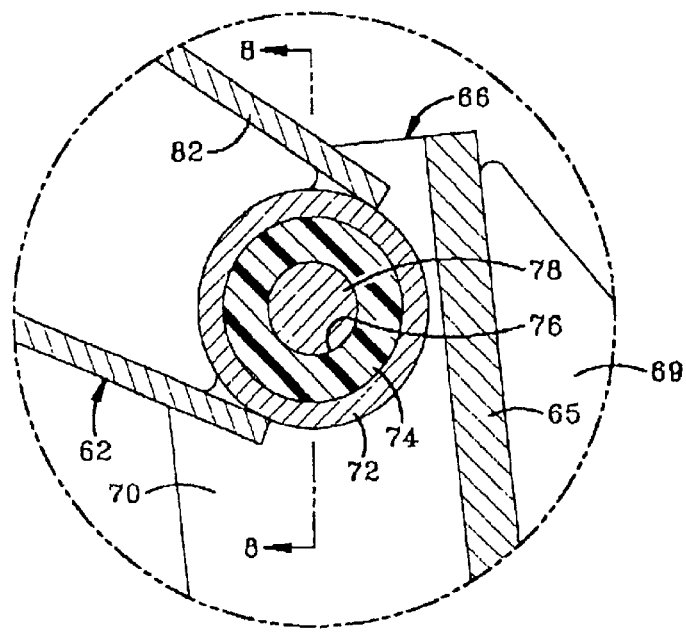
FIG. 7 is an enlarged sectional view of a portion of the lift axle suspension system shown in FIG. 2.
Figure 8:
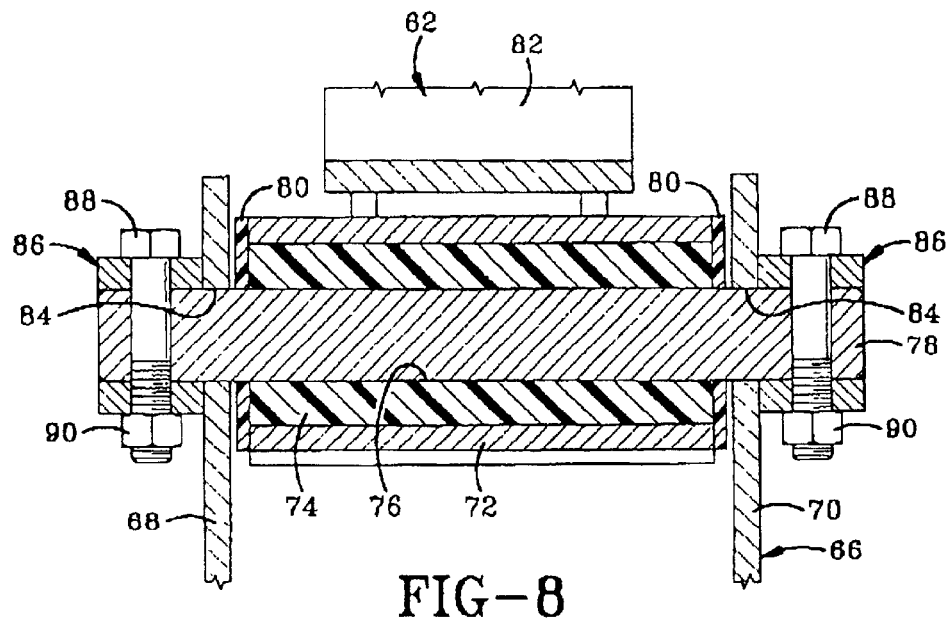
FIG. 8 is a sectional view taken along line 8—8 shown in FIG. 7.

Upper and lower articulating arms 62 and 64 are each pivotally connected between hanger portions 58 and 60 at one end, and an axle connector bracket 66 at the opposite end. Axle connector bracket 66 includes a pair of spaced apart axle connector portions 68 and 70 between which arms 62 and 64 are pivotally positioned. Specifically, each of arms 62 and 64 is a torque arm with a bushing or similar connector at each end thereof through which a pin pivotally connects the arm to hanger portions 58 and 60 and axle connector bracket 66, respectively. In more detail as shown in FIGS. 7–8, the bushing at each end of each articulating arm 62 and 64 is a cylinder 72 with a dampening material 74 lining the inside thereof defining an elongated hole 76 for receiving a pin 78. A cap 80 is positioned at each end thereof. The cylinder is rigidly affixed to a torque arm 82 that extends to an opposing cylinder at its other end, said opposing cylinder being of a similar design to the above described cylinder, dampening material and pin. Pin 78 is insertable through the hole 76 and holes 84 within the hanger portions 58 and 60, or axle connector portions 68 and 70. A locking cap 86 is insertable over each end of pin 78, where the locking cap is larger than holes 84, to prohibit removal of the pin from the hole. In the embodiment shown, locking cap 86 and pin 78 have alignable radial-like holes therein for receiving a locking mechanism such as a bolt 88 and nut 90 as a safety fastener to hold the locking caps on the pin. Locking cap 86 may be a one-piece design that is in effect a sleeve, or a two-piece design of two C-shape pieces that substantially mate to form a sleeve.

Steering dampener 44 is shown pivotally connected to axle connector bracket 66. In other embodiments it may be directly connected to the axle or other rigid structure. About the midsection of steering dampener 44 is a dampener bracket that slidably connects the tie rod 40 to the steering dampeners 44. Other designs as are known in the art as to tie rod and dampener assemblies may be used in lieu of the described design while still remaining within the spirit of the invention as described below in more detail.

Axle connector bracket 66 may be embodied as any design that pivotally receives articulating arms 62 and 64, dampener 44 (optional), and caster 20. In the embodiment shown, axle connector bracket 66 includes main surface 65 with spaced apart connector portions 68 and 70 extending therefrom. Opposite the portions 68 and 70, a main body 67 is rigidly affixed whereby strengthening supports 69 also connect main body 67 to surface 65.

Figure 4:
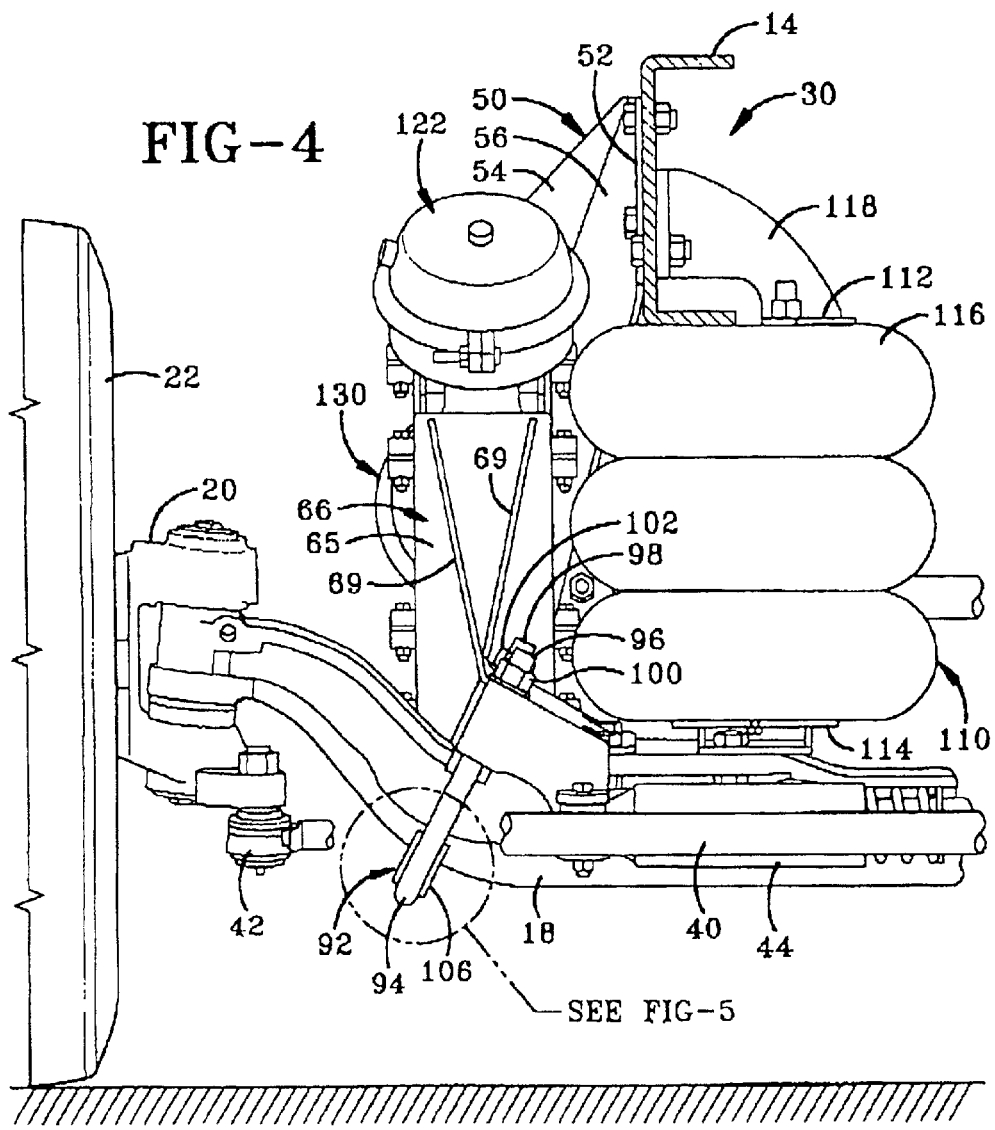
FIG. 4 is a fragmentary rear elevational view of one side of the first embodiment of the lift axle suspension shown in FIG. 3.
Figure 5:
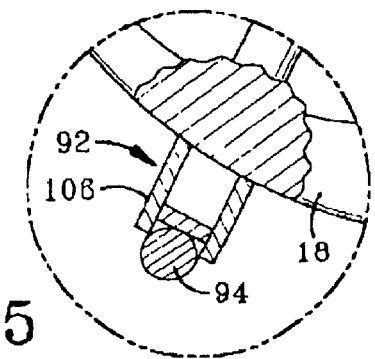
FIG. 5 is an enlarged sectional view of a portion of the lift axle suspension system shown in FIG. 4.

Axle connector bracket 66 is affixed to the lift axle 18 via clamping mechanism 92 as shown in FIGS. 3–4 and 6. Clamping mechanism 92 includes a U-bolt 94 positionable over the lift axle 18 so as to clamp the lift axle 18 against the axle connector bracket 66. U-bolt 94 has two threaded ends 96 and 98 that are inserted within two apertures in axle connector bracket 66 and secured therein by fasteners such as nuts 100 and 102 threaded onto the ends 96 and 98. A grooved spacer 106 is provided in between the U-bolt 94 and the lift axle 18 as best shown in FIGS. 4–6 where the spacer provides a seat for the U-bolt to firmly seat within. The spacer is designed to compliment the contours of both the lift axle and U-bolt it is positioned between thereby securely clamping the axle 18 between the U-bolt 94 and the axle connector bracket 66.

Regarding the shock absorbing action on the vehicle, conventional air valves and actuating means located in the cab of the vehicle (not shown) or in another convenient location are provided to manipulate the flow of pressurized air into or out of air bellows 110 which may be embodied as an air bellow, air spring, air bladder, or other similar device. In general, air bellows 110 is positioned between the frame rail 14 and the lift axle 18, and functions to provide dampening or shock absorption as is well known in the art. The design of air bellows 110 may be of any known design in the art that provides the necessary shock absorbing action as is needed by the given vehicle and its intended use. In the embodiment shown, air bellows 110 includes a pair of spaced apart ends 112 and 114 with a flexible extensible and retractable bladder 116 therebetween as is well known in the art. The upper end 112 is rigidly mounted to the frame rail via a mounting bracket 118, and the lower end 114 is rigidly mounted to the lift axle 18 using means known in the industry.

In operation as to the air bellows, the weight of the lift axle 18, the wheel assemblies 22, the lift axle suspension system 10, and other parts weighs down or pulls down the lift axle, wheel assemblies, lift axle suspension system and other parts. This weighting down occurs until the wheels engage a surface except where the lift axle suspension system counteracts the weight and lifts the lift axle, wheel assemblies, lift axle suspension system and other parts upward as described below in detail. The air bellows may be inflated as noted above to a desired pressure so as to provide the desired dampening between the road surface and the vehicle. Furthermore, this inflation if significant may increase the distance between the frame rail 14 and the lift axle 18 by forcibly pushing the frame rails and the vehicle thereon away from the lift axle further separating the parts. Once a preferred pressurization of the air bellow is achieved, the ride height is defined as is shown in FIGS. 11–14 and described in more detail below.

Figure 10:
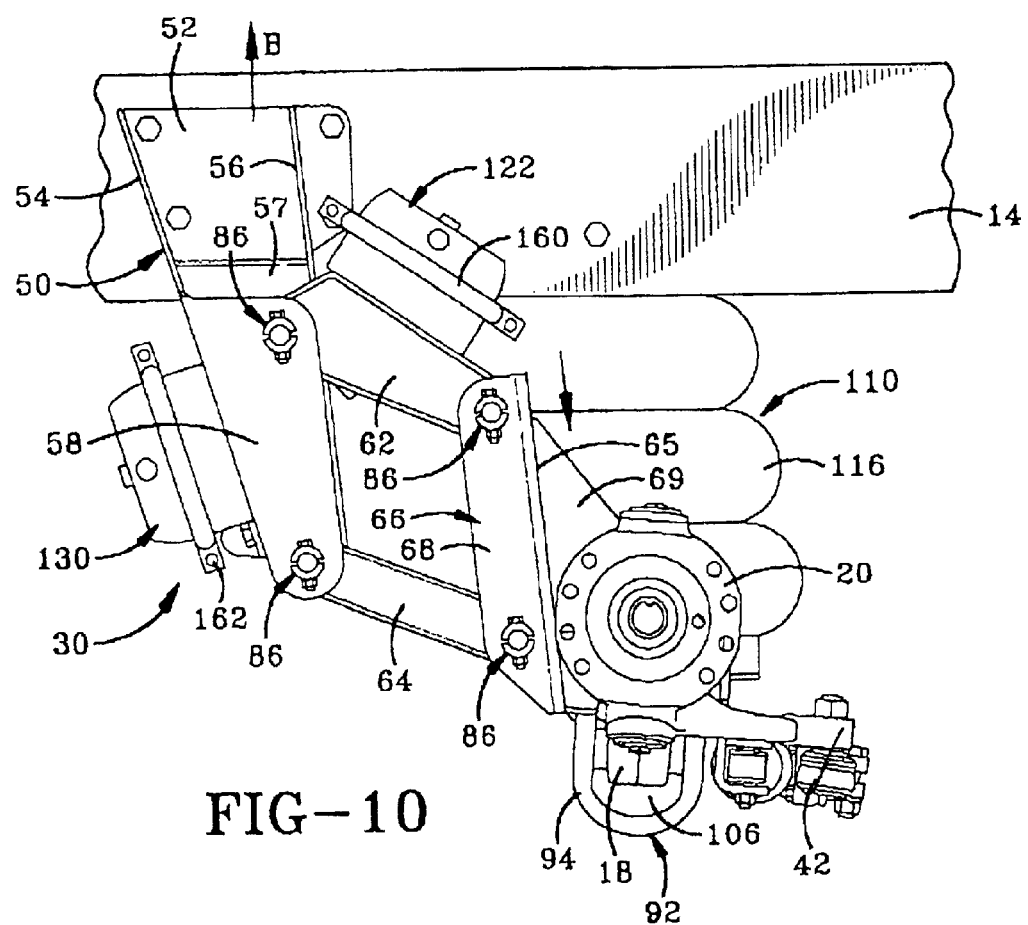
FIG. 10 is a fragmentary side elevational view of the first embodiment of the lift axle suspension system shown in FIG. 1 where the lift axle suspension is shown affixed to the frame rails of the vehicle in a second or upper position.
Figure 11:
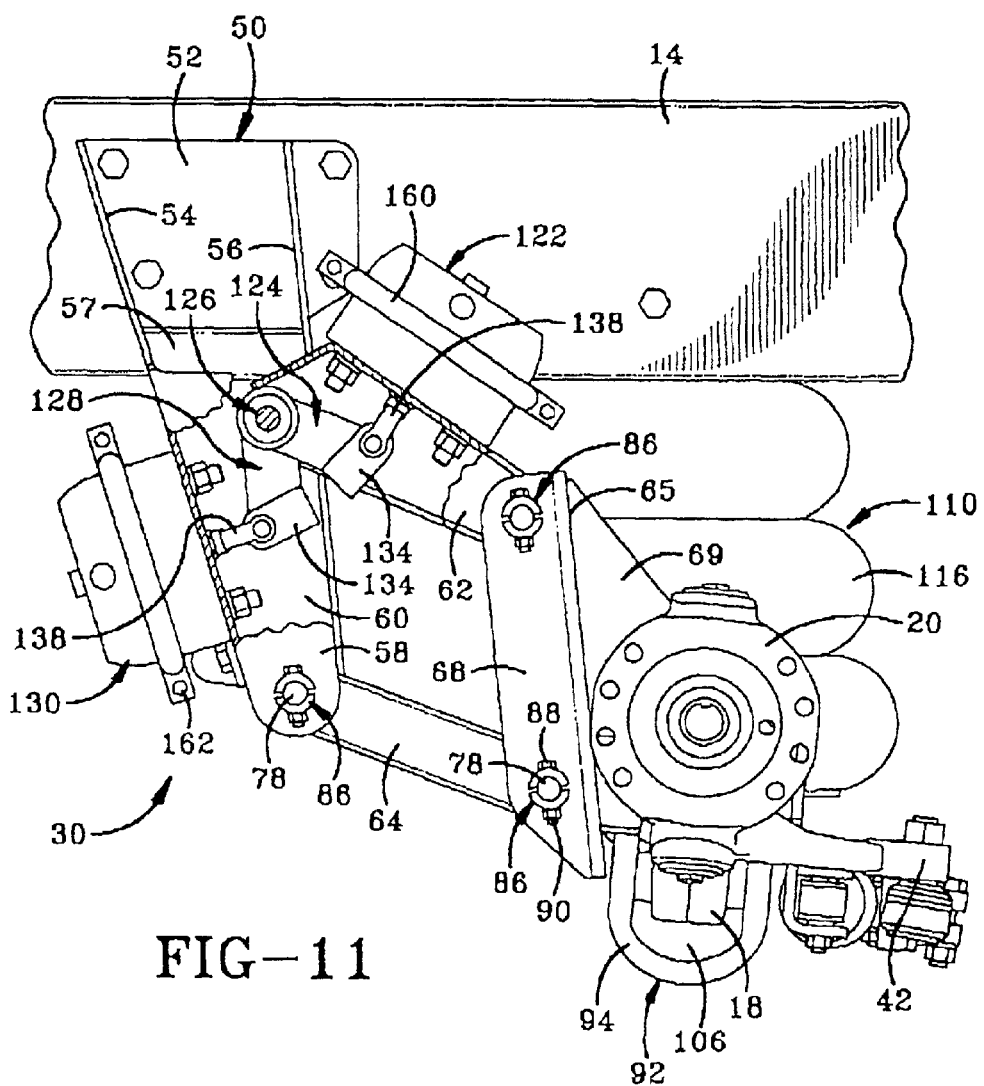
FIG. 11 is a fragmentary side elevational view of the first embodiment of the lift axle suspension system shown in FIG. 1 where the lift axle suspension is shown at ride height, which is an intermediate position.

In accordance with one of the features of the present invention, each of the two suspension assemblies 30 and 32 of the lift axle suspension system 10 includes a lift assembly 120. This lift assembly 120 provides the necessary force to selectively raise the wheels corresponding to the lift axle 18 of a vehicle out of engagement with the road surface. The lift assembly 120 of the first embodiment as shown in FIGS. 1–18 is best shown in FIGS. 11–13 to include an upper or movable diaphragm chamber assembly 122, an upper arm 124, a pivot 126, a lower arm 128, and a lower or fixed diaphragm chamber assembly 130.

Figure 9:
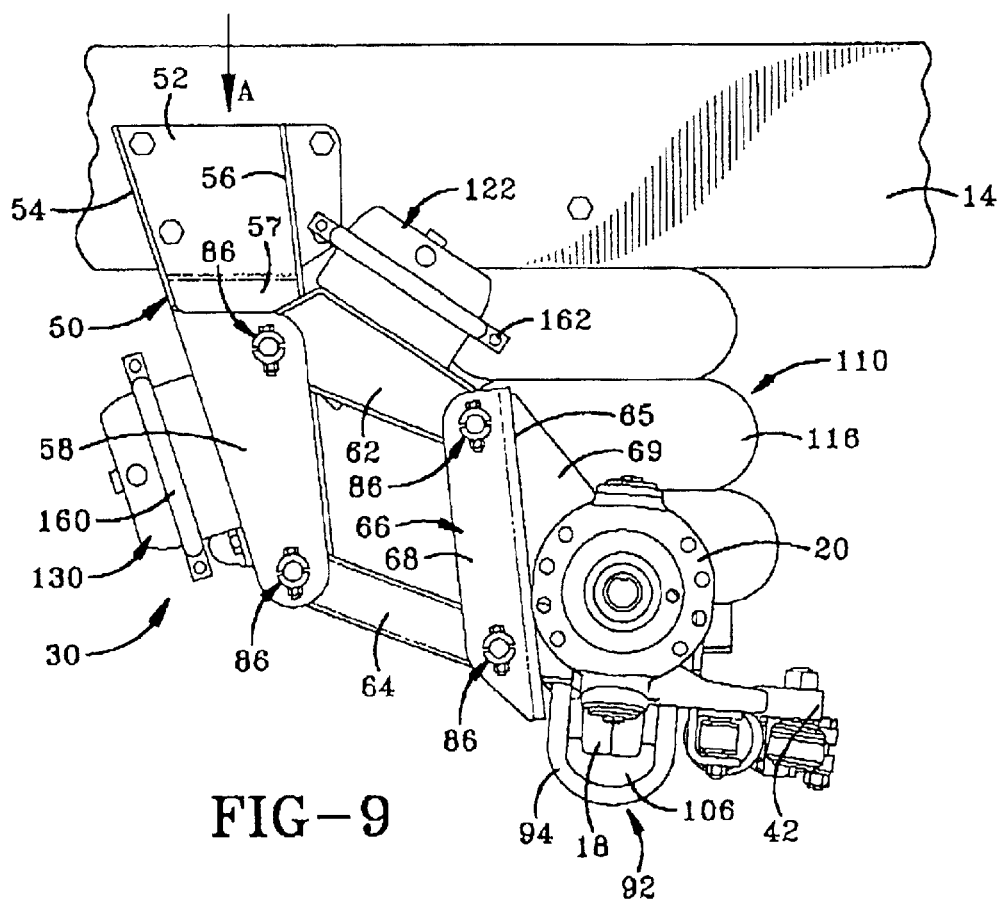
FIG. 9 is a fragmentary side elevational view of the first embodiment of the lift axle suspension system shown in FIG. 1 where the lift axle suspension is shown affixed to the frame rails of the vehicle in a first or lower position.

Diaphragm chamber assembly 122 is rigidly mounted to pivotally mounted upper articulating arm 62 while diaphragm chamber assembly 130 is rigidly mounted to rigidly fixed intermediate portion 54 of mounting bracket 50. In this manner, changes in pressurization within the chambers as discussed below cause movement of the articulating arms 62 and 64 with reference to the fixed mounting bracket 50. As a result, axle connector bracket 66 which is rigidly affixed to the lift axle 18 is raised as described in detail below. Different starting points may be chosen by the assembler based upon the location of the mounting bracket 50 on the frame rail. A lower position is shown in FIG. 9 as arrow A whereby the overall lift axle is positioned lower in relation to the frame rail such that additional range of motion is provided, while an upper position is shown in FIG. 10 as arrow B whereby the overall lift axle is positioned higher in relation to the frame rail such that a more compact design is provided.

The diaphragm chamber assemblies 122 and 130 are similar to each other where one is a mirror image of the other, so only chamber 122 is discussed below. Similarly, the arms 124 and 128 are similar to each other where one is a mirror image of the other, so only arm 124 is discussed below. The arms 124 and 128 are each basically two plates welded or otherwise affixed together. Specifically describing arm 124 although equally applicable to arm 128, arm 124 includes a first plate 132 that connects to pivot 126 and is offset from a second plate 134 that connects to a clevis 138 on a push rod 136 on assembly 122 as described below. The offset of plates 132 and 134 on a given arm (124 or 128) is coupled with an offset of arms 124 and 128 as mounted on pin 126 to allow the arms to pivot about the pin 126 until the plates 134 of the two arms 124 and 128 collide. This is best shown in FIG. 13 where the first plate 132 of arm 124 and first plate 132 of arm 128 are connected by pivot 126 such that the arms are not planar but instead are adjacent and overlap at pivot 126 to pivot in parallel, side by side planes, while the second plate 134 of arm 124 and the second plate 134 of second arm 128 are planar and thus selectively abut when pivoted toward each other thereby acting as a stop or hammer.

Diaphragm chamber assembly 122 includes a push rod 136 having a pivot clevis 138 mounted on the free end thereof where the clevis has a nut or similar structure about its one end that also acts as a stop prohibiting further insertion of the push rod into the chamber assembly. Pivot clevis 138 is mounted by any convenient mounting means such as a mounting pin or bolt to upper arm 124 (in the case of assembly 130 to lower arm 128). The other end of the push rod 136 is positioned within the diaphragm chamber 140 of assembly 122 and specifically mounted to a bladder plate 142 in chamber 140. The diaphragm chamber 140 also includes an upper chamber 144 and a lower chamber 146 with both upper and lower chambers 144 and 146 being formed with a central aperture 148 and 150 respectively. The push rod 136 operates through aperture 150 in lower chamber 146, while aperture 148 in upper chamber 144 defines an air inlet.

Referring to FIG. 12, Bladder plate 142 is positioned adjacent to the central portion of a flexible bladder 152. Flexible bladder 152 may take a variety of configurations, but in the preferred embodiment is a fiber reinforced rubber similar to that out of which rolling lobe air springs are manufactured. A coil spring 154 is mounted intermediate to lower chamber 146 and bladder plate 142 to provide constant pressure against the bladder plate as may be required during operation. The result is bladder plate 142 biased toward the upper chamber 144 as is shown in FIG. 12 where the spring 154 forces the bladder plate as far toward upper chamber 144 as is possible due to the stop built into clevis 138 as a nut that stops when it encounters lower chamber 146 around hole 150.

In assembly, flexible bladder 152 includes a central portion as discussed above bearing against bladder plate 142 and an annular ridge 158 sandwiched between upper chamber 144 and lower chamber 146 during assembly. A clamp ring 160 is then positioned around the annular ridge 158, upper chamber 144 and lower chamber 146 and is compressed by way of bolts or similar fasteners 162. The clamp ring 160 is of a design as is well known in the art and may be one piece with two ends that are bolted together via bolt 162, or a two piece design where two matable sections are aligned to form a ring and the respective ends of each section are aligned and bolted together. As bolts 162 are tightened, ring 160 becomes smaller and compresses upper chamber 144, lower chamber 146 and annular ridge 158 to secure an air tight arrangement. Central aperture 148 of upper chamber 144 is sized to receive a threaded attachment to secure air line 170 which is attached to any usual source of compressed air by the or on the vehicle, truck or trailer, such as a compressor.

As can be seen from our description of the Figures, and more particularly in accordance with the invention, diaphragm chamber assembly 122 (and obviously 130 also) and the elements associated therewith may take a variety of configurations without departing from the spirit of the present invention, but in accordance with the preferred embodiment of the invention, form a brake chamber such as those traditionally utilized with tractor trailer type air brakes. Diaphragm chamber assemblies 122 and 130 provide a stabilized air bellows like mechanism for selectively raising the wheels affixed to lift axle 18 out of engagement with the road surface. In the embodiments, two brake chambers are used to provide a coupling or additive effect so as to provide sufficient lift as needed to raise the heavy lift axle while still maintaining the compact nature of the system. This allows standard design, configuration, shape and size brake chambers to be used. It is contemplated that one, three or more diaphragm chambers may be used or needed depending upon the weight of the axle to be lifted, the envelope in which the lift assembly may be positioned, etc.

Figure 14:
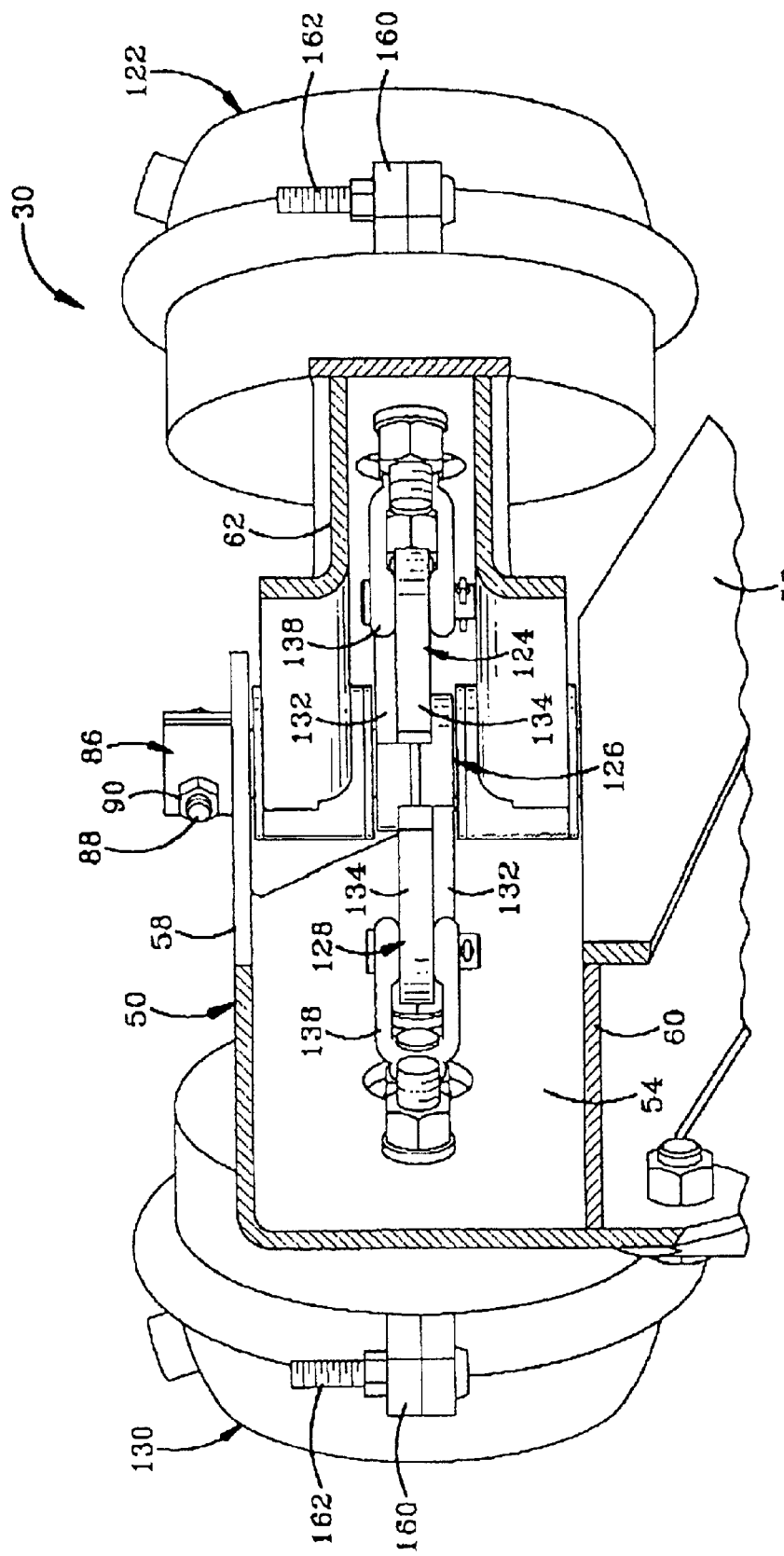
FIG. 14 is a fragmentary top plan view of the linkage of FIGS. 12–13 with portions of lift suspension shown in section.

Operationally, and referring specifically to FIGS. 1–14, the system is at desired equilibrium whereby the inflation of the air bellows 110 coupled with the weight of the frame rails 14, the articulating arms 62 and 64, axle bracket 66, lift axle 18, and the lift assembly 120 set the overall suspension at a ride height. Such a ride height is an intermediate position whereby the air bellows are partially open to a desired position for the best ride (optimal dampening) as shown in FIG. 11, and the bladder plate 142 and flexible bladder 152 are positioned at an intermediate location between the upper and lower chambers 144 and 146 as shown in FIG. 12 and as caused by spring forces in spring 154 and no or minimal pressurization of upper chamber 144, and the second plates or hammers 134 on upper and lower arms 124 and 128 are separated as shown in FIGS. 12–14.

Figure 15:
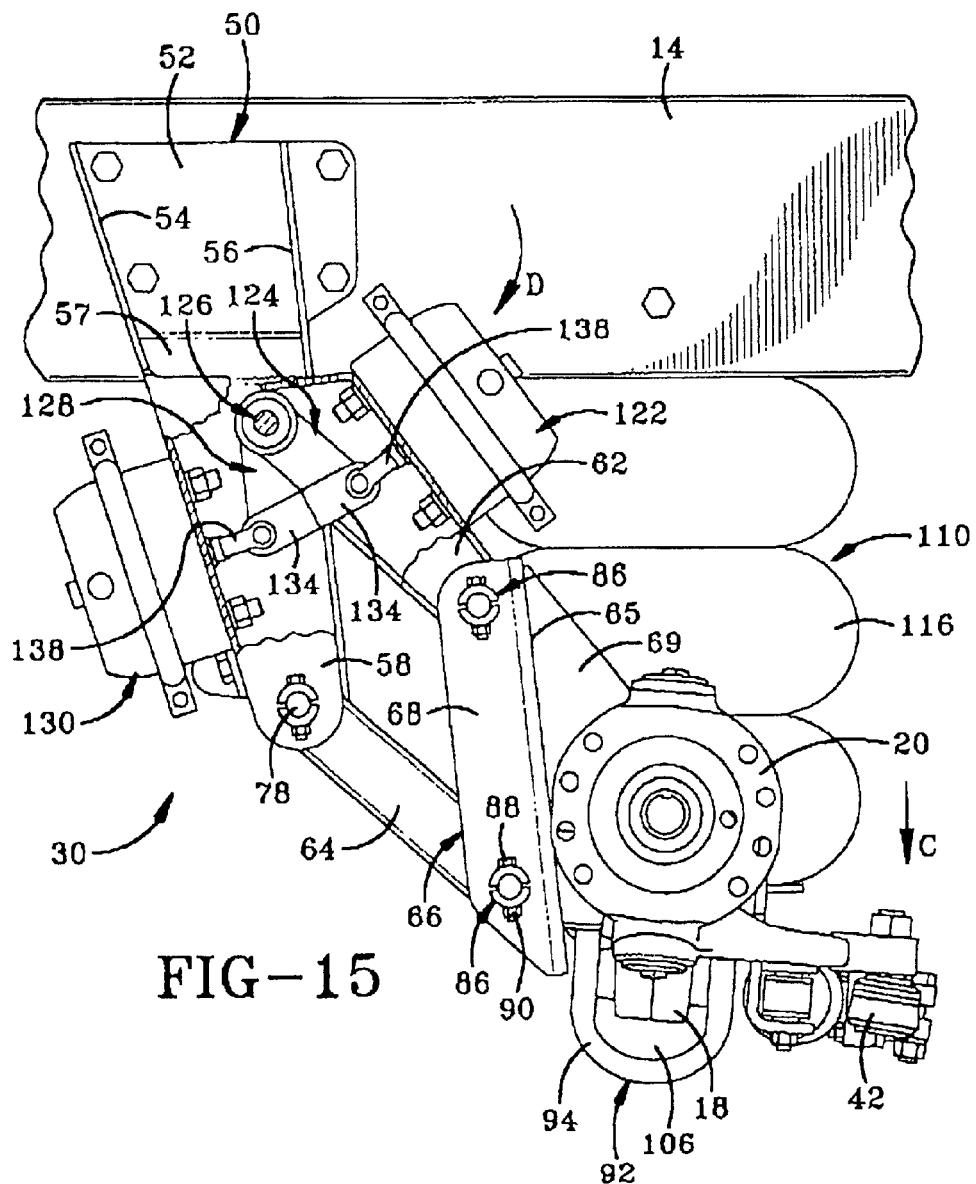
FIG. 15 is a fragmentary side elevational view of the first embodiment of the lift axle suspension system shown in FIG. 11 except the lift axle suspension is shown at rebound height, which is a lowermost position.

When a hole or other downward deviation in the road surface is encountered, rebound occurs. During rebound, the wheel assembly enters into an obstruction (typically only one wheel enters at a given time although both may) such as a hole in the road surface whereby the wheel assembly and associated lift axle 18 suddenly drop due to the lack of a surface thereunder and the overall weight of the system as is shown by arrow C in FIG. 15. The result is the wheel assembly 22, at least a portion of lift axle 18 relative in position to wheel assembly 22, and all parts connected thereto suddenly drop including the axle connector bracket 66 in relation to the overall vehicle. Bracket 66 pivots downward about its connection points to articulating arms 62 and 64 which similarly pivot about its connection points to mounting bracket 50. The result is a larger gap between the frame rails 14 and lift axle 18 caused by a pivoting of the lift axle suspension at two degrees of freedom about mounting bracket 52 as is generally shown in FIG. 15 by arrow D.

Figure 16:
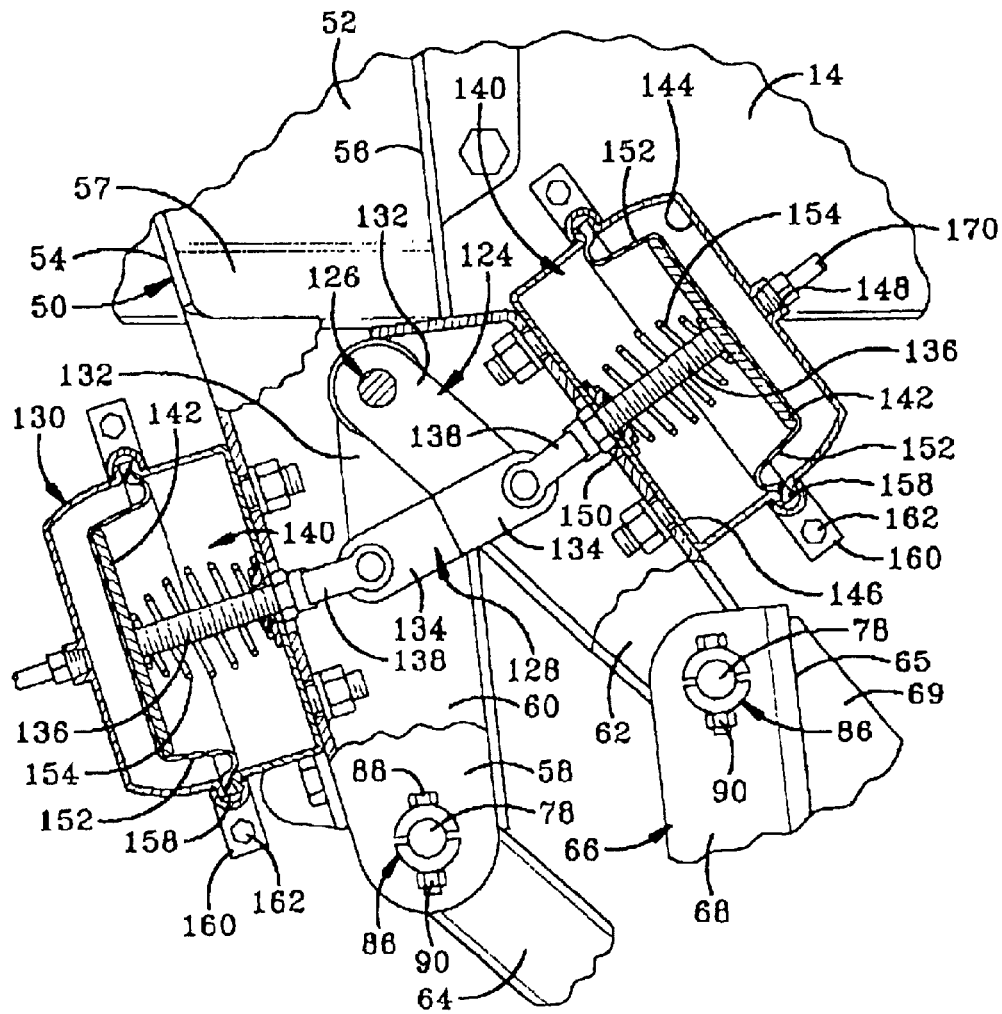
FIG. 16 is an enlarged fragmentary view of the diaphragm chambers and connecting linkage plus surrounding lift suspension parts of FIG. 15 with the diaphragm chambers shown in section and the lift axle suspension shown in a lowermost position.
Figure 17:
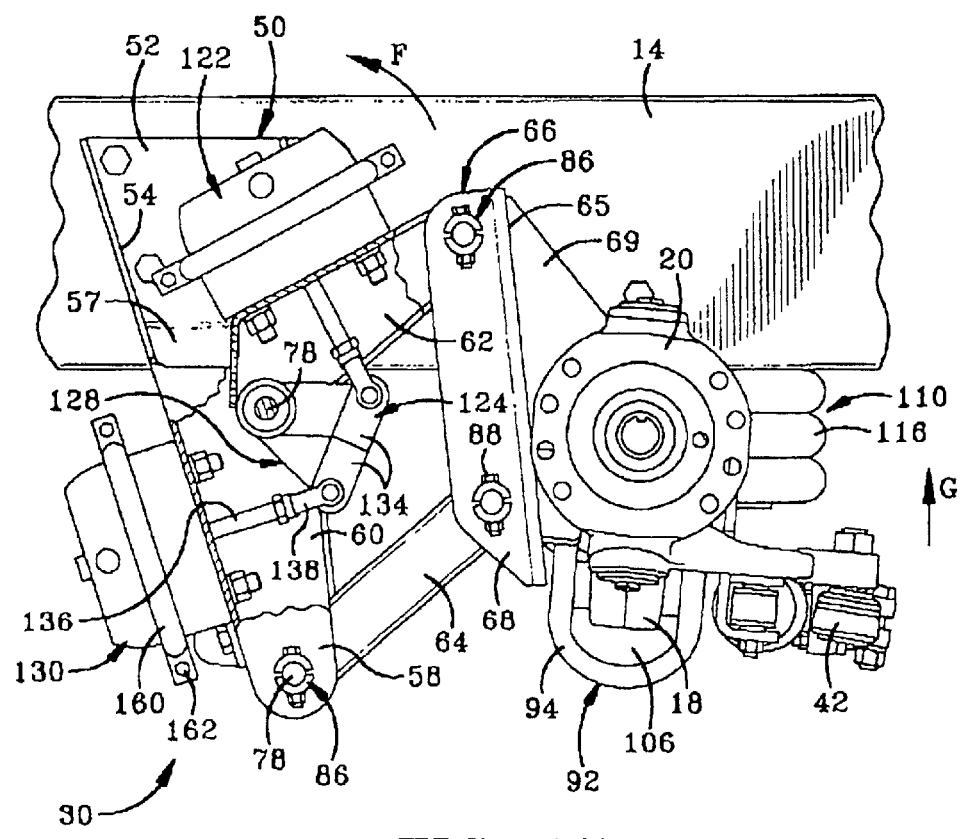
FIG. 17 is a fragmentary side elevational view of the first embodiment of the lift axle suspension system shown in FIG. 11 except the lift axle suspension is shown at retracted height, which is an uppermost position.

This pivoting action is allowed until hammers 134 on arms 124 and 128 interact as is shown in FIG. 16 whereby further dropping of the wheel assembly 22 and lift axle 18 is prohibited. In more detail, articulating arms 62 and 64 as shown in FIG. 16 pivot clockwise about their respective pivotal connections to mounting bracket 52 pulling diaphragm chamber 122 that is affixed to arm 62 downward in the same direction. Hammers 134 pivot toward one another until interaction whereby further pivoting of arms 124 and 128 is prohibited, and ultimately further pivoting of articulating arm 62 is prohibited because clevis 138 is seated against lower chamber 146 in both diaphragm chambers 122 and 130. The system has bottomed out at jounce rebound height.

Figure 18:
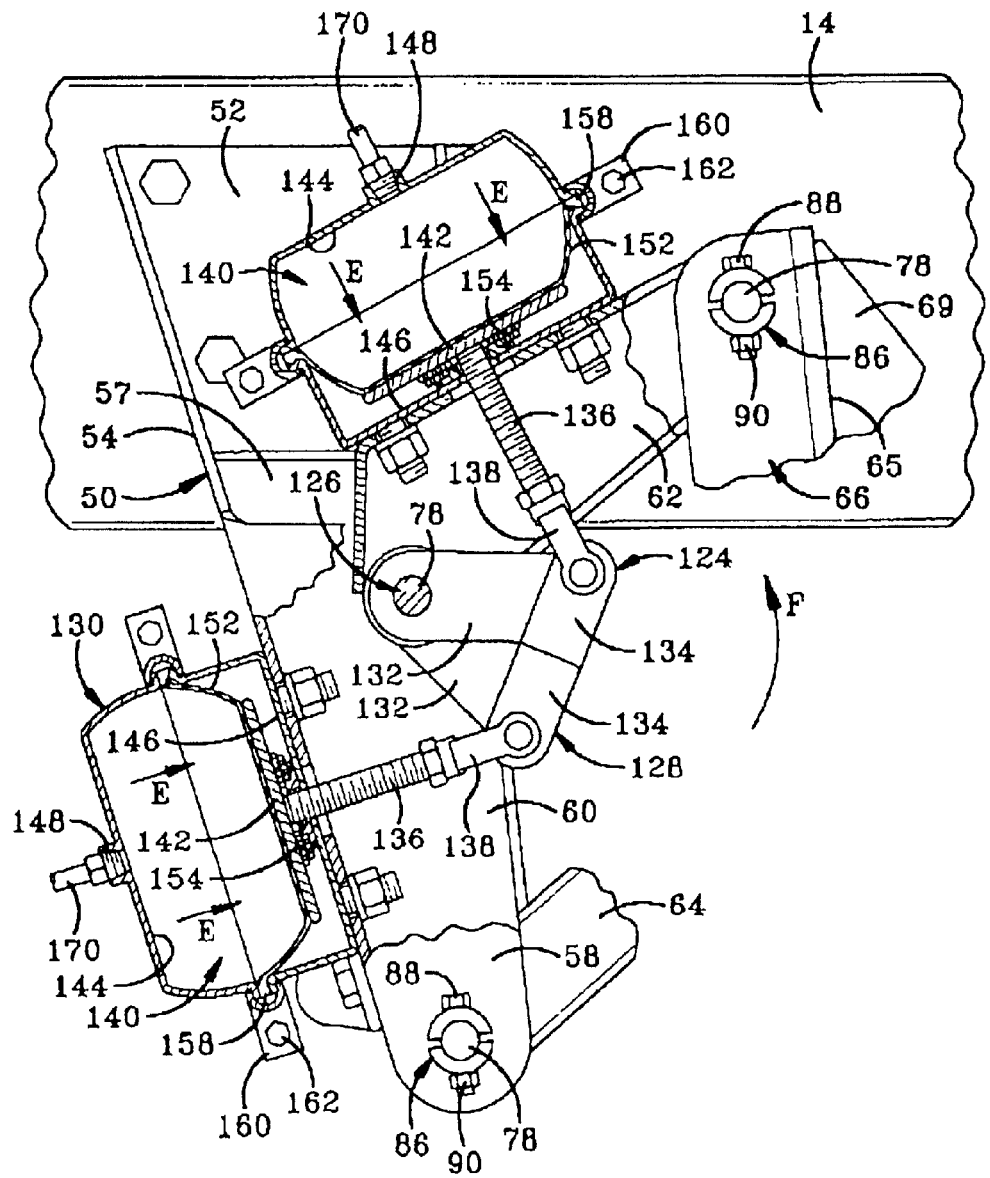
FIG. 18 is an enlarged fragmentary view of the diaphragm chambers and connecting linkage plus surrounding lift suspension parts of FIG. 17 with the diaphragm chambers shown in section and the lift axle suspension shown in an uppermost position.

When the vehicle user desires to raise the lift axle, the lift axle suspension system 10 is pivoted to raise the wheels out of engagement with the road surface. To accomplish this raising of the wheels, pressurized fluid such as air is provided through input 148 from a usual source such as a compressor carried on the truck or trailer such that air traveling through inlet 148 will flood upper chamber 144 of both diaphragm chambers 122 and 130 with air, which in one embodiment is at approximately 70–110 lbs. per square inch. In both diaphragm chambers 122 and 130, the pressurized air forces the bladder plate 142, due to the flexible bladder 152 that prohibits the pressurized air from entering the lower chamber, to compress the spring 154 against the lower chamber 146 as shown in FIG. 18 by arrows E. The push rod 136 is pushed out of the lower chamber 144 such that clevis 138 forces the pivoting of arms 124 and 128. Specifically, the push rod 136 and clevis 138 of lower diaphragm chamber 130 pushes the arm 128 to pivot counterclockwise (away from chamber 130) about pivot 126 as shown in FIG. 18. Simultaneous therewith, the push rod 136 and clevis 138 of upper diaphragm chamber 122 pushes the arm 124 to pivot clockwise (away from chamber 122) about pivot 126 as shown in FIG. 18. The counterclockwise motion of arm 128 and clockwise motion of arm 124, results in hammers 134 interacting or meeting.

Once hammers 134 of each arm 124 and 128 have met, and since lower diaphragm 130 is rigidly fixed to mounting bracket 52, all force of continued pressurization of the upper chamber 144 of diaphragm chamber 130 is translated from push rod 136 and clevis 138 of lower diaphragm chamber 130 through mated hammers 134 of each arm 124 and 128 into push rod 136 and clevis 138 of upper diaphragm chamber 122, and coupled with the force of continued pressurization of the upper chamber 144 of diaphragm chamber 122 which is translated into push rod 136 and clevis 138 thereof. This force translation causes articulating arm 62 rigidly affixed to the upper diaphragm chamber 144 to move counterclockwise as is shown by arrow F in FIG. 18. In more detail, as a result of the continued pressurization of the upper chambers 144 of both diaphragm chambers 122 and 130 as shown by arrow E, upper diaphragm chamber assembly 122, upper arm 124, and lower arm 128 pivot counterclockwise about pivot 126 as shown by arrow F whereby such clockwise rotation forces upper and lower articulating arms 62 and 64 upward in a pivoting manner about the pinned connection of each arm to hanger portions 58 and 60. Since tire wheel assembly 22 is mounted on lift axle 18, and lift axle 18 is connected to axle connector bracket 66 which is also pivotally connected to articulating arms 62 and 64, this upward pivot as shown by arrow F causes an upward movement of lift axle 18 as shown by arrow G. The result is a selective raising of the wheels on lift axle 18 of the vehicle out of engagement with the road surface.

This first embodiment of lift axle suspension system 10 as shown in FIGS. 1–18 provides a system for lifting a lift axle where standard, interchangeable, cost effective, readily available parts are integrated therein, and of a design such that most if not all mechanics in the truck maintenance field are capable and qualified to perform maintenance and repair thereon.

A second embodiment of the lift axle suspension system is shown in FIGS. 19–22 as 210. Since the assemblies 10 and 210 have similarities where many common parts are used, only the new parts, features, and connections are discussed in detail where identical parts are identically numbered while modified or new parts use new numbers. As with the first embodiment, the lift axle suspension system 210 is mounted on vehicle 12 having the pair of frame rails 14 where multiple axles 16 and lift axle 18 are attached.

Lift axle suspension system 210 includes a pair of suspension assemblies joined by axle 18, and one of such assemblies is shown in the FIGS. 19–22 as 230. Suspension assembly 230 includes a mounting bracket 250 that is rigidly affixed to frame rail 14. Mounting bracket 250 includes a main plate 252, a hanger plate 258, a cover plate 261 and a plurality of strength ribs 263. The hanger plate 258 extends transversely outward from the main plate 252 and provides a surface to fix the fixed diaphragm chamber 130 from, whereby the hanger plate divides the planar main plate into a frame mounting portion 252A through which the bracket is welded, bolted or otherwise affixed to the frame rail, and an articulating arm hanger portion 252B that is substantially identical is shape, design and operation to the parallel and spaced apart cover plate 261 which is affixed thereto via the hanger portion 258 and functions similar to portion 252B as an articulating arm hanger. In the embodiment shown, the cover plate 261 is an approximate C-shape.

Upper and lower articulating arms 262 and 264 are each pivotally connected between mounting bracket 250 and cover plate 261 at one end, and axle connector bracket 66 at the opposite end, using the bushing and pin connection described above. Specifically, each of arms 262 and 264 is substantially identical to arms 62 and 64 including the details of the bushings on each end thereof, except that proximate the end pivotally attached to the mounting bracket, the arms include rigidly attached or integral connector extensions 265 and 267.

In accordance with one of the features of the second embodiment of the present invention, each of the two suspension assemblies, including 230, of the lift axle suspension system 210 includes a lift assembly 320. This lift assembly 320 provides the necessary force to selectively raise the wheels corresponding to the lift axle 18 of a vehicle out of engagement with the road surface. The lift assembly 320 includes an upper or fixed diaphragm chamber assembly 130, a link plate 326, and a lower or movable diaphragm chamber assembly 122. Link plate 326 is integral with or rigidly attached to lower diaphragm chamber assembly 130, and pivotally affixed to extension 267 via leg 271.

In assembly, diaphragm chamber assembly 130 is rigidly mounted to hanger portion 258 while its clevis 138 is pivotally mounted to link plate 326. The link plate 326 is also pivotally connected to extensions 265 on arm 262, and arm 271 as described above. Clevis 138 of diaphragm chamber assembly 122 is pivotally connected to extension 267 on arm 264 whereby the rigid arm 271 is connected to the extension in between pin 78 and clevis 138. In this manner, increases in pressurization within the chambers causes translation of the push rods 136 thereby pivoting articulating arms 262 and 264 with reference to the bushings pivotally connecting the arms to mounting bracket 250 and cover plate 261. As a result, axle connector bracket 66 which is rigidly affixed to the lift axle 18 is raised.

Figure 19:
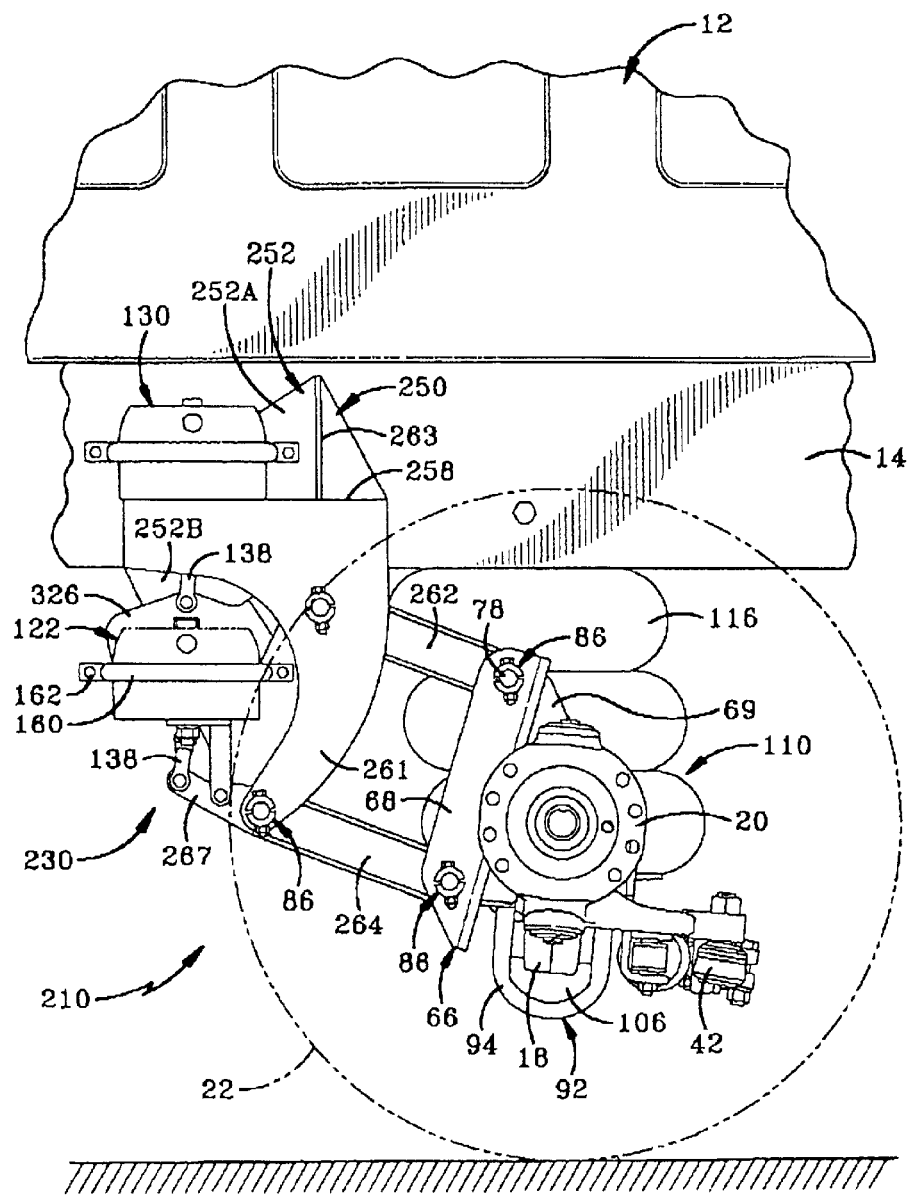
FIG. 19 is a fragmentary side elevational view of the second embodiment of the lift axle suspension system with portions of the vehicle broken away and the vehicle tire adjacent to the system shown in hidden lines.
Figure 20:
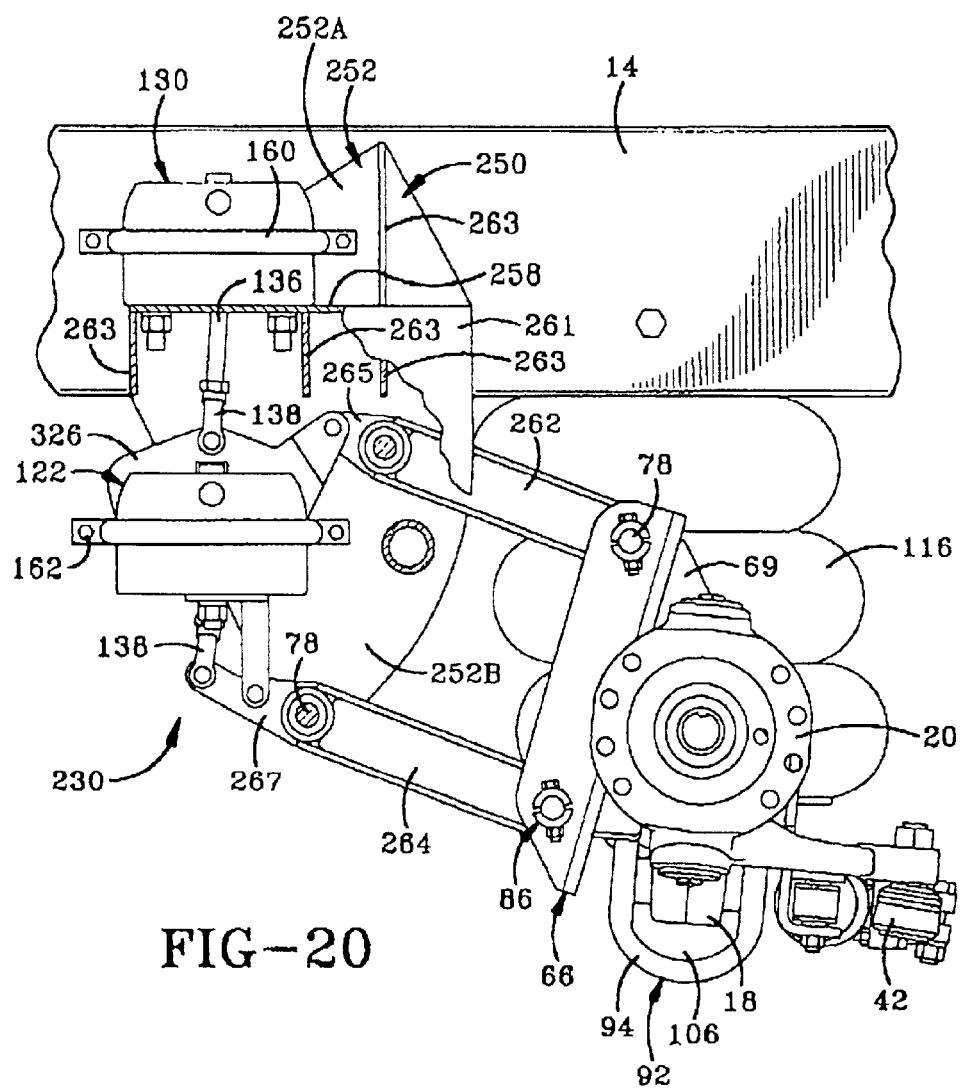
FIG. 20 is a fragmentary side elevational view of the second embodiment of the lift axle suspension system of FIG. 19 where the lift axle suspension is shown at ride height.
Figure 21:
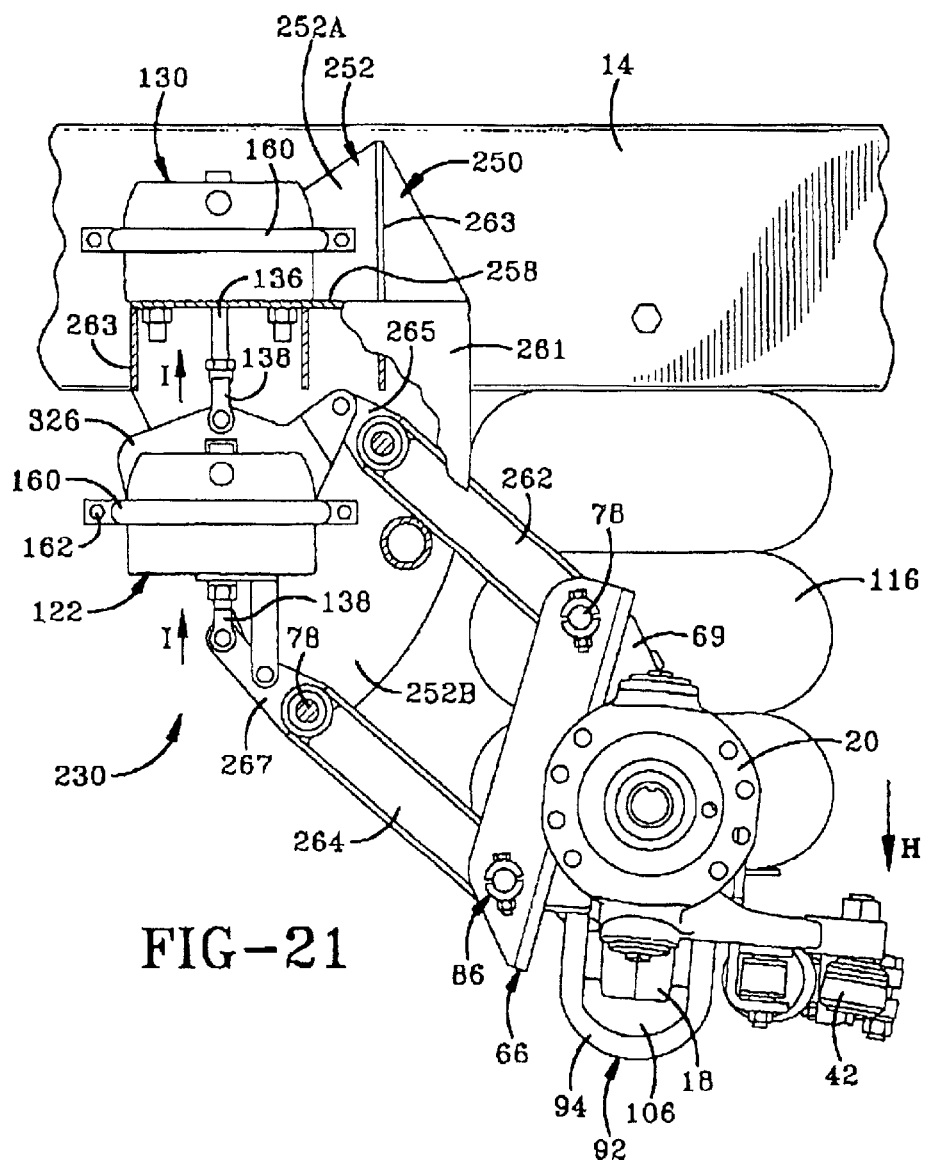
FIG. 21 is a fragmentary side elevational view of the second embodiment of the lift axle suspension system of FIG. 19 where the lift axle suspension is shown at rebound height.

Operationally, and referring specifically to FIGS. 19–20, the system is at desired equilibrium whereby the inflation of the air bellows 110 coupled with the weight of the frame rails 14, the articulating arms 262 and 264, axle bracket 66, lift axle 18, and the lift assembly 320 set the overall suspension at a ride height. When a hole or other downward deviation in the road surface is encountered, rebound occurs as the wheel assembly and associated lift axle 18 suddenly drop due to the lack of a surface thereunder and the overall weight of the system as is shown by arrow H in FIG. 21. The result is the wheel assembly 22, at least a portion of lift axle 18 relative in position to wheel assembly 22, and all parts connected thereto suddenly drop including the axle connector bracket 66 in relation to the overall vehicle. Bracket 66 pivots downward about its connection points to articulating arms 262 and 264 which similarly pivot about its connection points to hanger portion 252B and cover plate 261 as shown in FIG. 21 as a clockwise rotation. The result is push rods 136 being forced inward as shown by arrows 1 such that bladder plate 142 further compresses the fluid within the upper chamber 144. This increased compression acts as a dampener to slow or stop the downward translation of the wheel assembly and associated lift axle 18.

Figure 22:
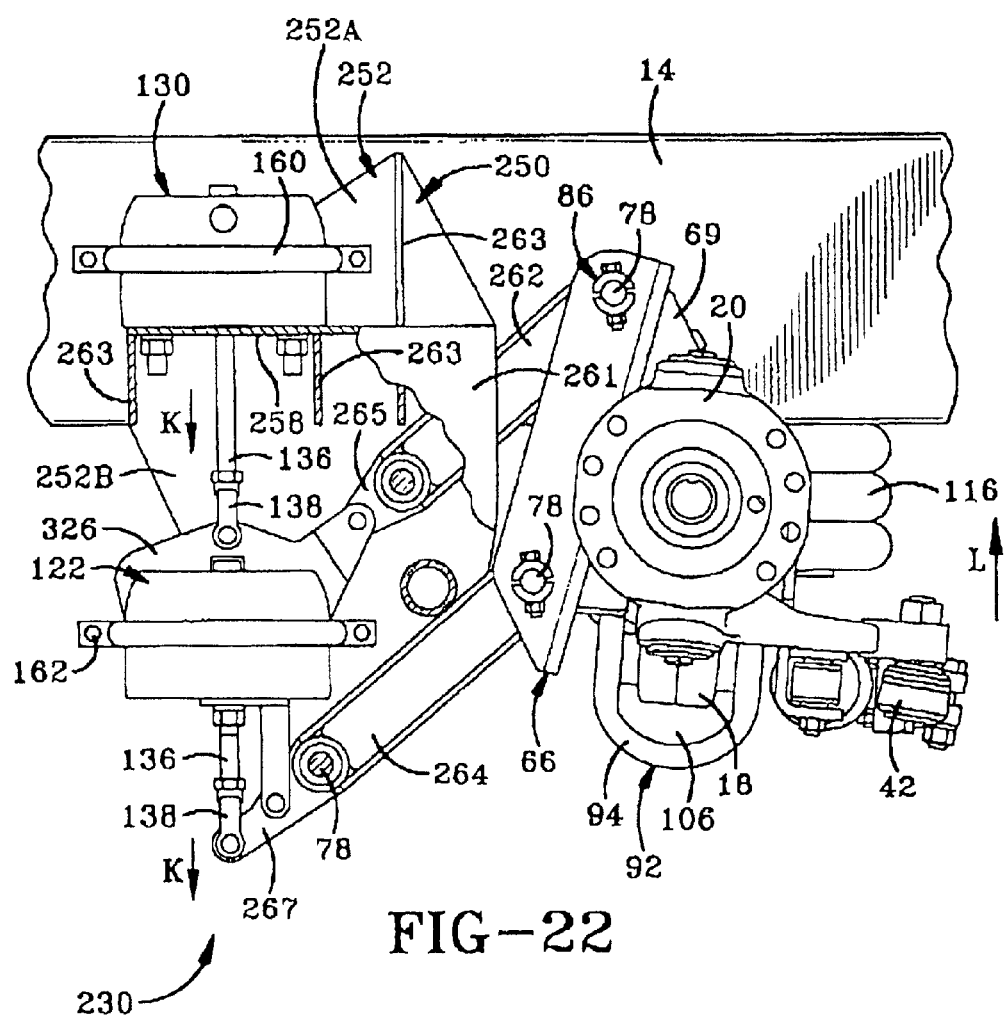
FIG. 22 is a fragmentary side elevational view of the second embodiment of the lift axle suspension system of FIG. 19 where the lift axle suspension is shown at retracted height.
Figure 23:
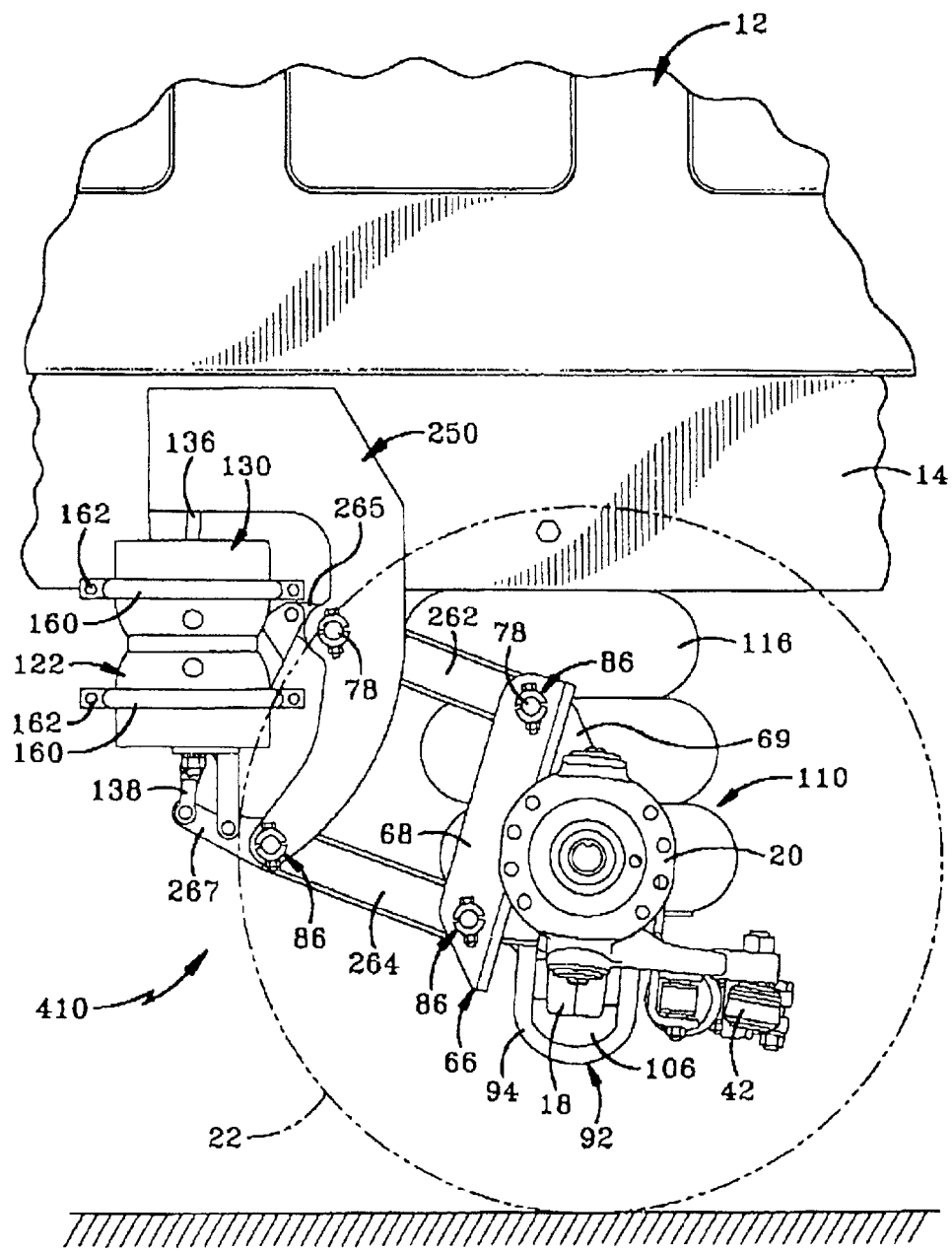
FIG. 23 is a fragmentary side elevational view of the third embodiment of the lift axle suspension system with portions of the vehicle broken away and the vehicle tire adjacent to the system shown in hidden lines
Figure 24:
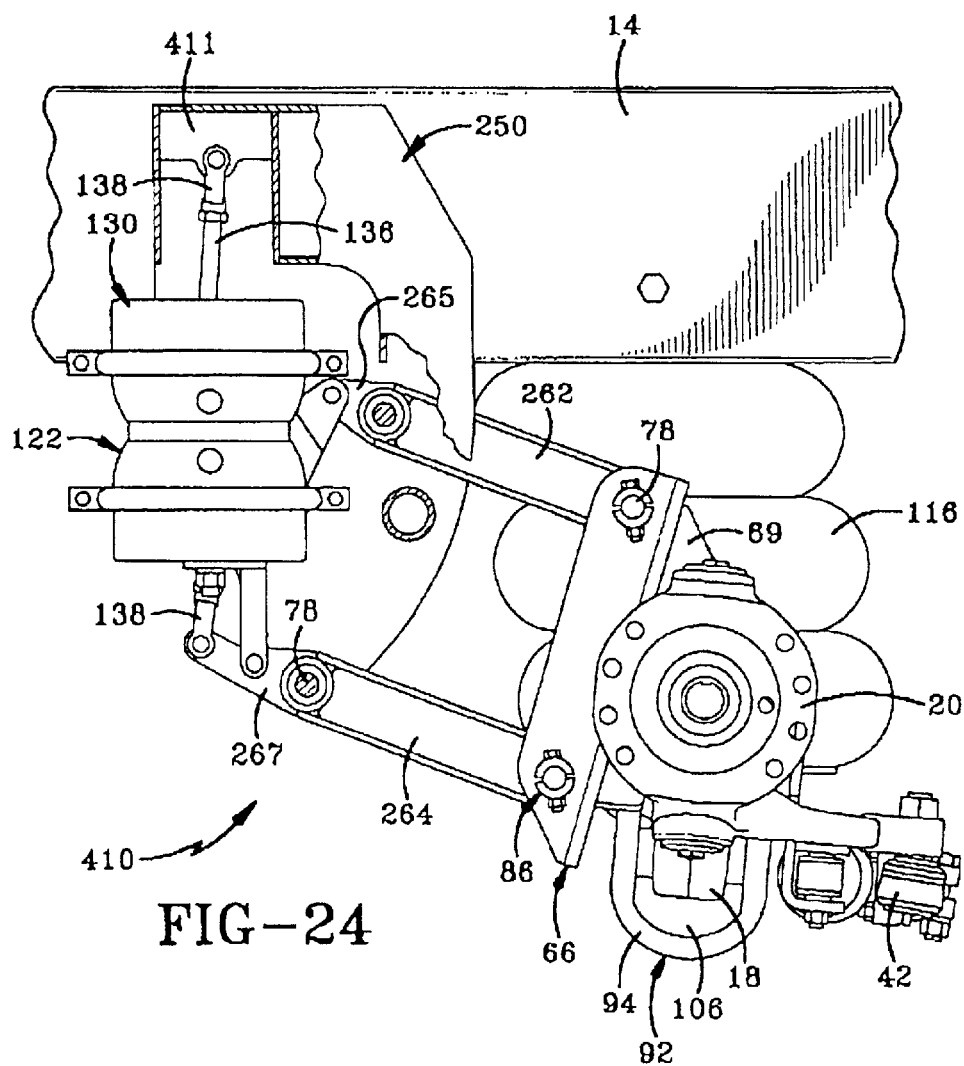
FIG. 24 is a fragmentary side elevational view of the third embodiment of the lift axle suspension system of FIG. 23 where the lift axle suspension is shown at ride height.

When the vehicle user desires to raise the lift axle, the lift axle suspension system 210 is pivoted to raise the wheels out of engagement with the road surface. To accomplish this raising of the wheels, pressurized fluid such as air is provided through air input 148. Bladder plates 142 push the push rods 136 outward as shown by arrows K. Articulating arms 262 and 264 pivot about its connection points to mounting bracket 250 and cover plate 261 in a counter-clockwise manner as shown in FIG. 22 resulting in axle connector bracket 66 pivoting upward about its connection points to articulating arms 262 and 264. This lifts the lift axle 18 and the attached wheels as shown by arrow L, as well as compresses the air bellows 118.

A third embodiment is shown in FIGS. 23–26 with lift axle suspension system 410 which is similar to the second embodiment except that the diaphragm chambers 122 and 130 are oriented differently in relation to each other and affixed differently. Specifically, in the second embodiment, both diaphragm chambers are oriented such that the air inlets are oriented upwards while the push rods are oriented downward, while in the third embodiment, the diaphragm chambers are oriented such that the air inlets are adjacent to one another and the push rods are opposite one another. In addition, the diaphragm chambers are affixed to one another in the third embodiment and the clevis 138 of each are pivotally connected to the fixed mounting bracket 250 and extension 267, while in the second embodiment the diaphragm chambers are affixed as described above.

A significant difference exists in that in the first two embodiments one of the diaphragm chambers was rigidly affixed while the other moved, while in this third embodiment both diaphragm chambers are moveable but not in relation to one another as each is rigidly affixed to the other. In effect, a slightly modified mounting bracket is used (although its functionality and operation is substantially the same as well as all main components of main plate, hanger plate, cover plate and a plurality of strength ribs except that the hanger plate does not necessarily divide the main plate and the clevis pivotally mounts on a clevis mount 411 between strength ribs and/or the hanger plate), and the upper diaphragm chamber assembly is reversed such that the clevis 138 is pivotally connected to the frame rail 14 while the chamber body is rigidly affixed to the link plate and/or lower diaphragm chamber body in contrast to the second embodiment where the clevis is pivotally connected to the link plate that is rigidly affixed to or integral with the lower diaphragm chamber rather than the frame rail and the diaphragm chamber body is affixed to the frame rail.

Figure 25:
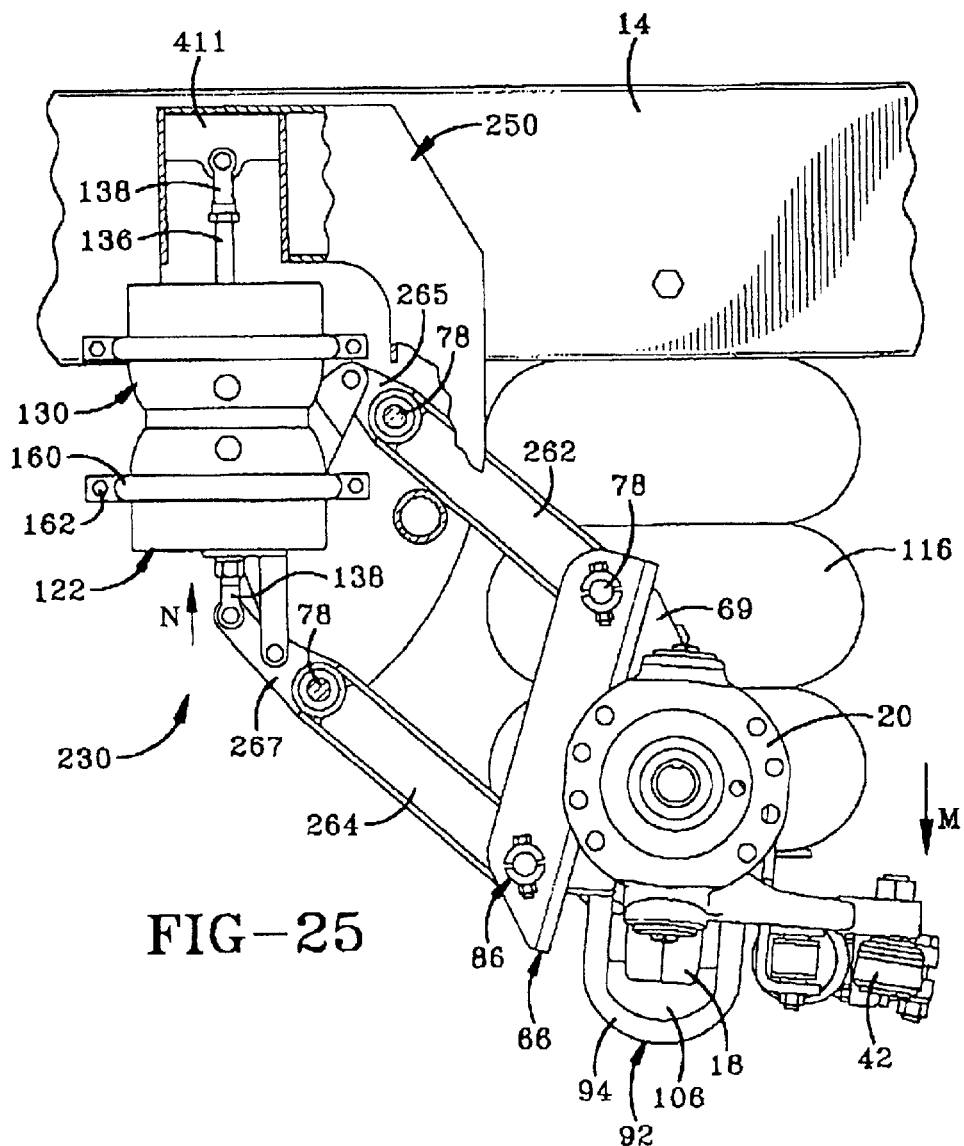
FIG. 25 is a fragmentary side elevational view of the third embodiment of the lift axle suspension system of FIG. 23 where the lift axle suspension is shown at rebound height.

As a result, when rebound occurs as is shown in FIG. 25, the lift axle 18 drops as shown by arrow M resulting in axle connector bracket 66 and arm 262 and 264 movement as described above for the second embodiment. As shown by arrow N, this forces push rod 136 of the lower diaphragm chamber 122 inward where the pressurized upper chamber dampens the rebound as is well known in the art.

Figure 26:
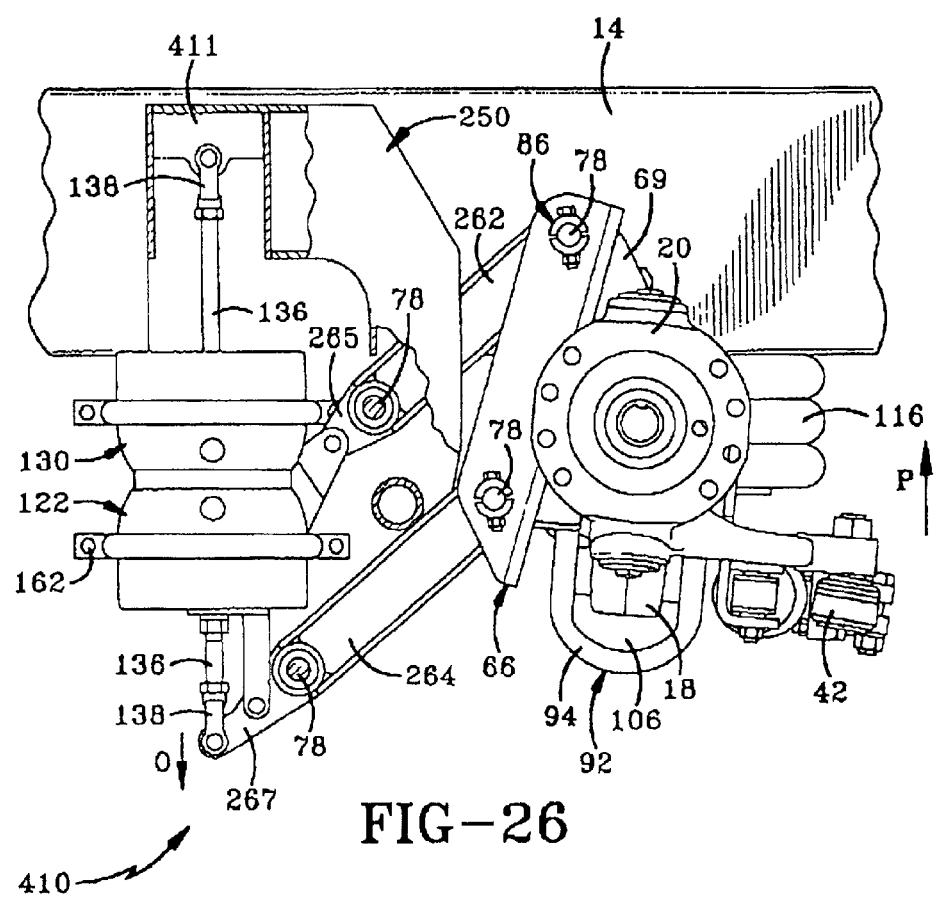
FIG. 26 is a fragmentary side elevational view of the third embodiment of the lift axle suspension system of FIG. 23 where the lift axle suspension is shown at retracted height.

When lifting of the lift axle 18 is desired as is shown in FIG. 26, the lift axle suspension system 410 is pivoted to raise the wheels out of engagement with the road surface. To accomplish this raising of the wheels, pressurized fluid such as air is provided through air input 148. Flexible bladders 152 push the push rods 136 outward as shown by arrow O. Articulating arms 262 and 264 pivot about its connection points to mounting bracket 250 and cover plate 261 in a counterclockwise manner as shown in FIG. 26 resulting in axle connector bracket 66 pivoting upward about its connection points to articulating arms 262 and 264. This lifts the lift axle 18 and the attached wheels as shown by arrow P, as well as compresses the air bellows 118.

A fourth embodiment is shown in FIGS. 27–30 with lift axle suspension system 610 which is similar to the third embodiment except that the diaphragm chambers 122 and 130 are positioned and affixed differently and the mounting bracket 612 is reversed and of a slightly different design. Mounting bracket 612 includes a main plate 614 of a triangular design through which the bracket is welded, bolted or otherwise affixed to the frame rail and which extends downward below the frame rail to provide for a first hanger portion 616, spaced apart and outward extending reinforcing members 618, a cover plate 620, and a clevis mount 622. Articulating arms 662 and 664 are of a similar design to other articulating arms as described above including bushings and pins on each thereof, and are pivotally connected at one end between the main plate 614 and cover plate 620, and at the other end to axle connector bracket 66.

Figure 27:
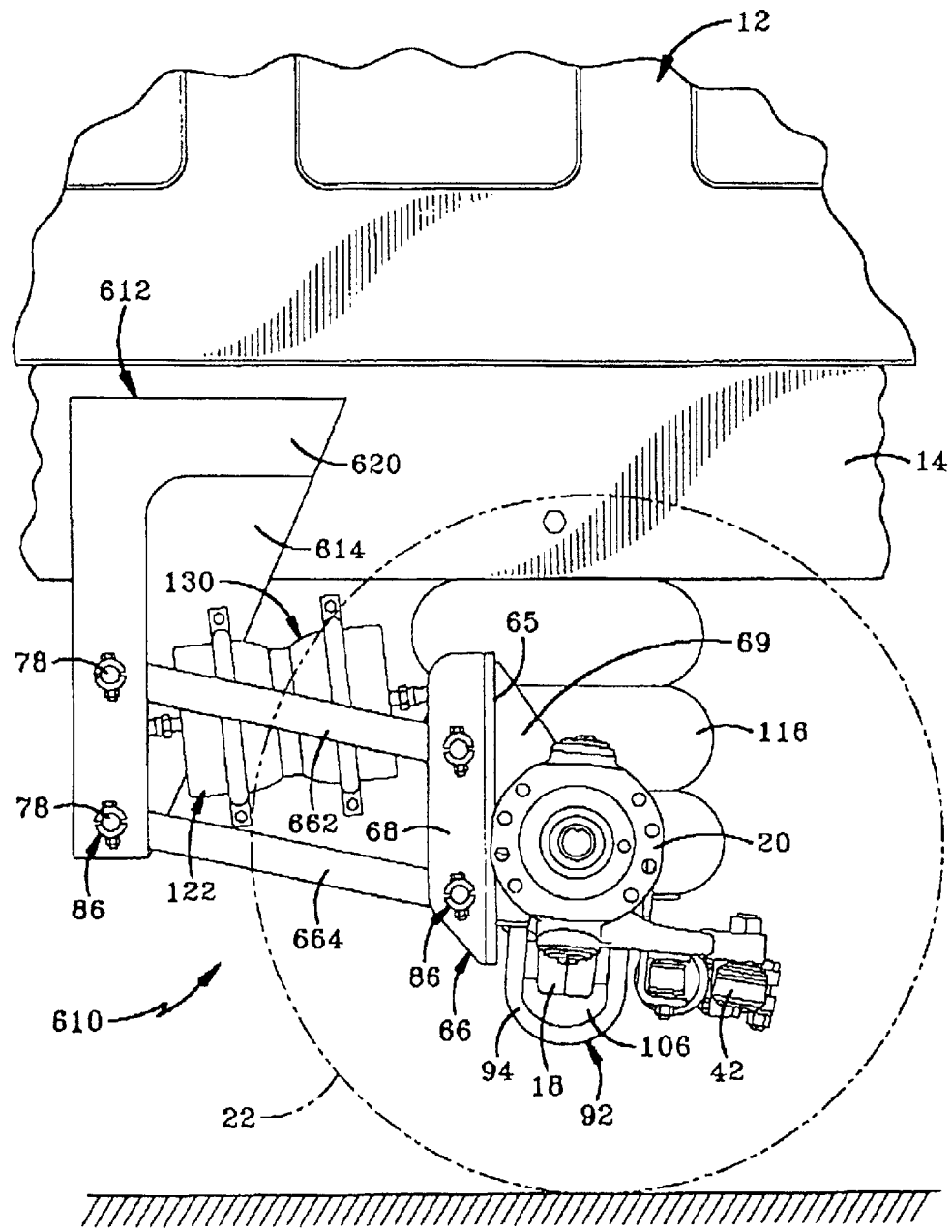
FIG. 27 is a fragmentary side elevational view of the fourth embodiment of the lift axle suspension system with portions of the vehicle broken away and the vehicle tire adjacent to the system shown in hidden lines.
Figure 28:
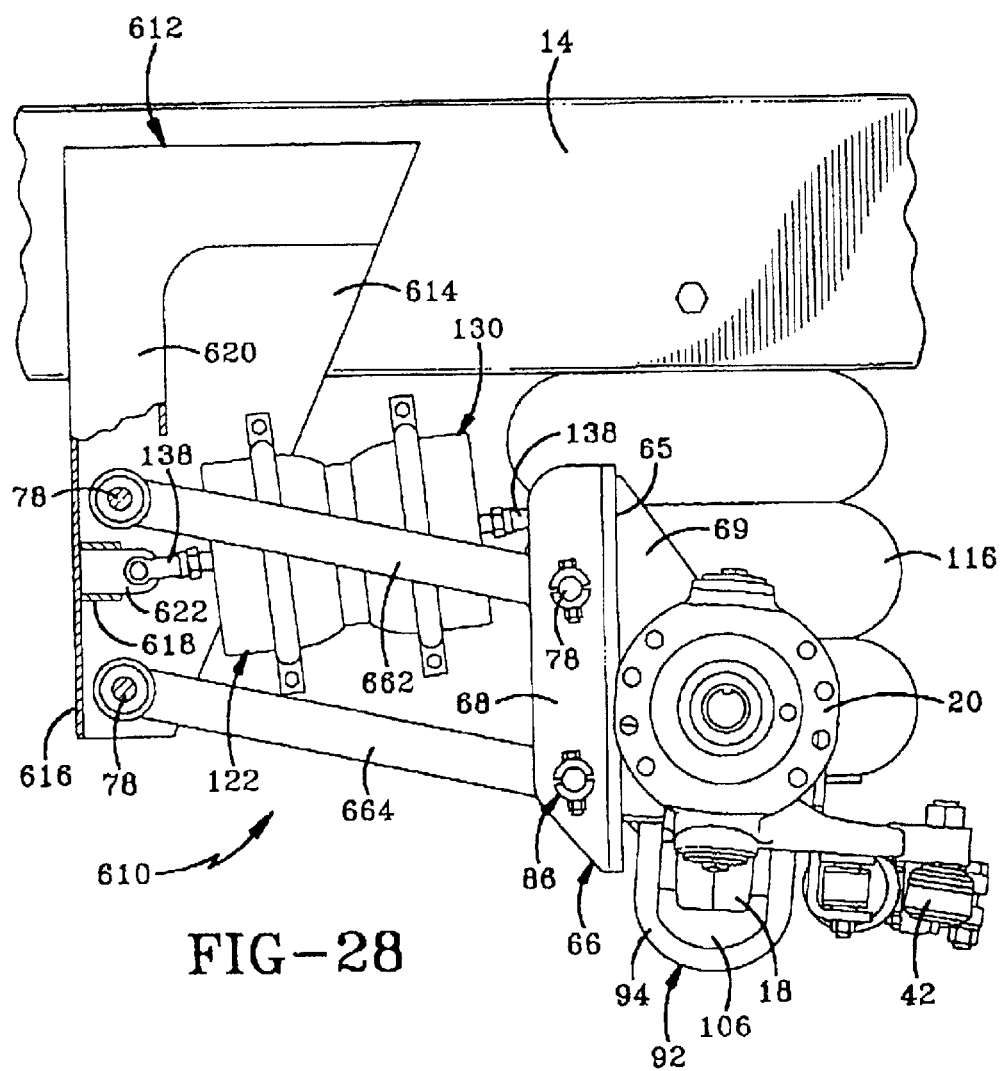
FIG. 28 is a fragmentary side elevational view of the fourth embodiment of the lift axle suspension system of FIG. 27 where the lift axle suspension is shown at ride height.
Figure 29:
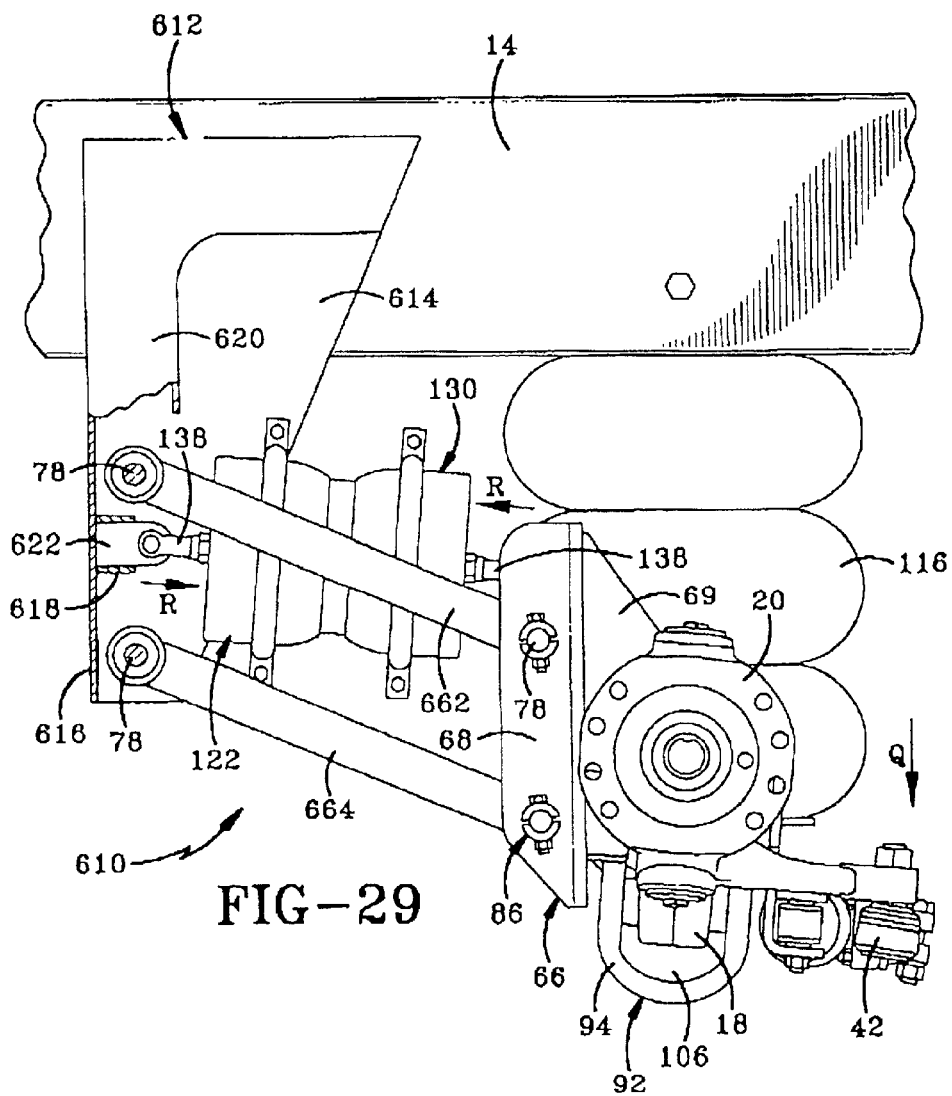
FIG. 29 is a fragmentary side elevational view of the fourth embodiment of the lift axle suspension system of FIG. 27 where the lift axle suspension is shown at rebound height.
Figure 30:
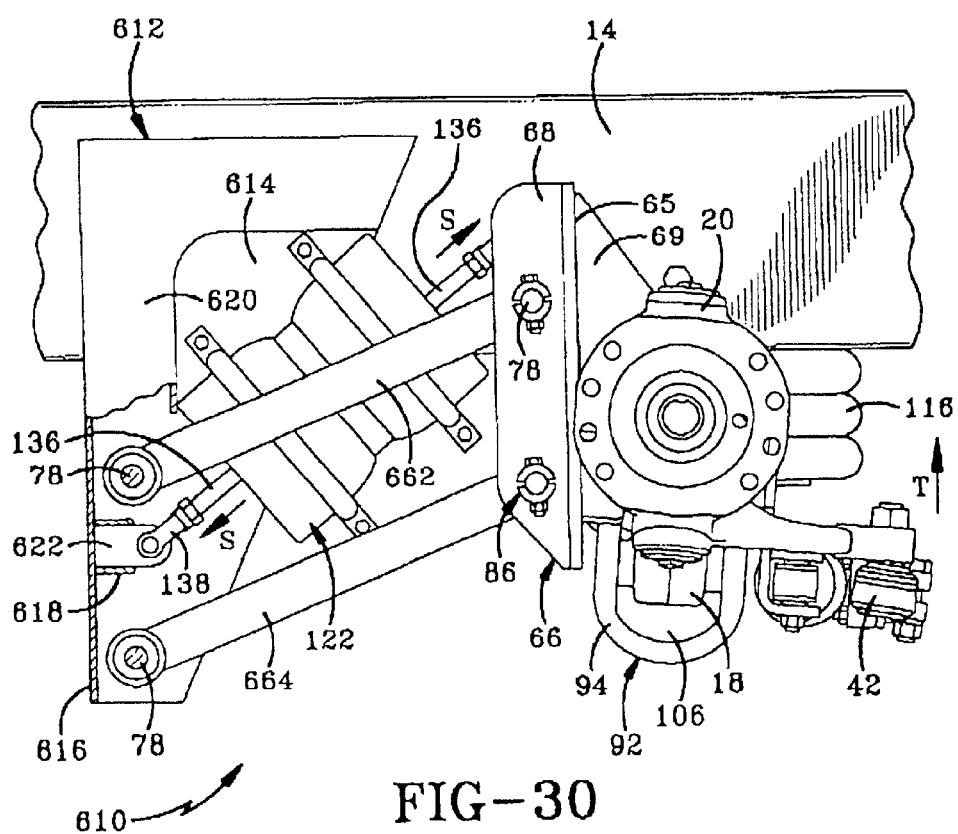
FIG. 30 is a fragmentary side elevational view of the fourth embodiment of the lift axle suspension system of FIG. 27 where the lift axle suspension is shown at retracted height.

As is shown in FIGS. 27–28, the diaphragm chambers are positioned in a horizontal or substantially horizontal manner while in the third embodiment the diaphragm chambers are oriented in a vertical or substantially vertical manner. Otherwise, the lift axle suspension system works in the same manner described above for the third embodiment whereby rebound causes the lift axle to drop as shown by arrow Q thus pushing the push rods inward as shown by arrows R as is shown in FIG. 29, while lifting occurs by pressurizing the upper chambers causing the push rods to push outward as shown by arrows S this causing the lift axle to be lifted as shown by arrow T in FIG. 30.

Accordingly, the improved lift axle suspension system is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A lift axle suspension system for selectively raising a vehicle axle and raising wheel assemblies attached thereto out of engagement with a road surface, the vehicle having a longitudinally extending frame member on either side thereof, said system comprising with respect to each frame member:

a mounting bracket rigidly affixed to the frame member;

a first and a second articulating arm each having first and second ends, the first end of each articulating arm being pivotally attached to the mounting bracket, and the second end of each articulating arm being pivotally attached to the axle;

first and second diaphragm chamber assemblies each having therein a movable wall including a flexible bladder; the movable wall dividing the diaphragm chamber assembly into an upper chamber and a lower chamber; the upper chamber being adjustably pressurized to move the movable wall;

a push rod extending from each diaphragm chamber assembly for translating movement of the movable wall whereby the push rod is interconnected to the lift axle suspension system in a manner such that translated movement of the push rod causes pivotal movement of the articulating arms and axle attached thereto; and a pivot arm pivotally connected to a distal end of each push rod;

the pivot arms being pivotally connected together.

2. A lift axle suspension system for selectively raising a vehicle axle and raising wheel assemblies attached thereto out of engagement with a road surface, the vehicle having a longitudinally extending frame member on either side thereof, said system comprising with respect to each frame member:

a mounting bracket rigidly affixed to the frame member;

a first and a second articulating arm each having first and second ends, the first end of each articulating arm being pivotally attached to the mounting bracket, and the second end of each articulating arm being pivotally attached to the axle;

first and second diaphragm chamber assemblies each having therein a movable wall including a flexible bladder; the movable wall dividing the diaphragm chamber assembly into an upper chamber and a lower chamber; the upper chamber being adjustably pressurized to move the movable wall; the first diaphragm chamber assembly being mounted in a pivotal manner while the second diaphragm chamber assembly is mounted in a fixed manner; and a push rod extending from each diaphragm chamber assembly for translating movement of the movable wall whereby the push rod is interconnected to the lift axle suspension system in a manner such that translated movement of the push rod causes pivotal movement of the articulating arms and axle attached thereto.

3. A lift axle suspension system for selectively raising a vehicle axle and raising wheel assemblies attached thereto out of engagement with a road surface, the vehicle having a longitudinally extending frame member on either side thereof, said system comprising with respect to each frame member:

a mounting bracket rigidly affixed to the frame member;

a first and a second articulating arm each having first and second ends, the first end of each articulating arm being pivotally attached to the mounting bracket, and the second end of each articulating arm being pivotally attached to the axle;

first and second diaphragm chamber assemblies each having therein a movable wall including a flexible bladder; the movable wall dividing the diaphragm chamber assembly into an upper chamber and a lower chamber; the upper chamber being adjustably pressurized to move the movable wall; the first diaphragm chamber assembly being rigidly mounted to the pivotally mounted first articulating arm, while the second diaphragm chamber assembly is rigidly mounted to the mounting bracket;

a push rod extending from each diaphragm chamber assembly for translating movement of the movable wall whereby the push rod is interconnected to the lift axle suspension system in a manner such that translated movement of the push rod causes pivotal movement of the articulating arms and axle attached thereto; and a pivot arm pivotally connected to a distal end of each push rod; the pivot arms being pivotally connected about one of the pivotal attachments of the articulating arms to the mounting bracket.

4. A lift axle suspension system for selectively raising a vehicle axle and raising wheel assemblies attached thereto out of engagement with a road surface, the vehicle having a longitudinally extending frame member on either side thereof, said system comprising with respect to each frame member:

a mounting bracket rigidly affixed to the frame member;

a first and a second articulating arm each having first and second ends, the first end of each articulating arm being pivotally attached to the mounting bracket, and the second end of each articulating arm being pivotally attached to the axle; the first and second articulating arms including extensions extending beyond the respective pivotal connection of each arm to the mounting bracket and in a direction generally opposite the arm direction toward the axle connection, and where the first and second articulating arms are pivotally connected respectively via the extensions to a pivot arm;

first and second diaphragm chamber assemblies each having therein a movable wall including a flexible bladder; the movable wall dividing the diaphragm chamber assembly into an upper chamber and a lower chamber; the upper chamber being adjustably pressurized to move the movable wall;

a push rod extending from each diaphragm chamber assembly for translating movement of the movable wall whereby the push rod is interconnected to the lift axle suspension system in a manner such that translated movement of the push rod causes pivotal movement of the articulating arms and axle attached thereto.

5. The lift axle suspension system of claim 4 wherein the first diaphragm chamber assembly is rigidly mounted to the mounting bracket while the second diaphragm chamber assembly is rigidly mounted to the pivot arm.

6. A lift axle suspension system for selectively raising a vehicle axle and raising wheel assemblies attached thereto out of engagement with a road surface, the vehicle having a longitudinally extending frame member on either side thereof, said system comprising with respect to each frame member:
  a mounting bracket rigidly affixed to the frame member;
  a first and a second articulating arm each having first and second ends, the first end of each articulating arm being pivotally attached to the mounting bracket, and the second end of each articulating arm being pivotally attached to the axle;
  first and second diaphragm chamber assemblies each having therein a movable wall including a flexible bladder; the movable wall dividing the diaphragm chamber assembly into an upper chamber and a lower chamber; the upper chamber being adjustably pressurized to move the movable wall;
  a push rod extending from each diaphragm chamber assembly for translating movement of the movable wall whereby the push rod is interconnected to the lift axle suspension system in a manner such that translated movement of the push rod causes pivotal movement of the articulating arms and axle attached thereto; and
  a pivot arm with the first and second diaphragm chamber assemblies connected thereto, while the push rod for the first diaphragm chamber assembly is pivotally connected to the mounting bracket and the push rod for the second diaphragm chamber assembly is pivotally connected to one of the articulating arms.

7. The lift axle suspension system of claim 6 wherein the first and second articulating arms include extensions extending beyond the pivotal connection of the articulating arms to the mounting bracket and in a direction generally opposite the articulating arm direction toward the axle connection, and where the first and second articulating arms are pivotally connected respectively via the extensions to the pivot arm.

8. A lift axle suspension system for selectively raising a vehicle axle and raising wheel assemblies attached thereto out of engagement with a road surface, the vehicle having a longitudinally extending frame member on either side thereof, said system comprising with respect to each frame member:
  a mounting bracket rigidly affixed to the frame member;
  a first and a second articulating arm each having first and second ends, the first end of each articulating arm being pivotally attached to the mounting bracket, and the second end of each articulating arm being pivotally attached to the axle;
  first and second diaphragm chamber assemblies each having therein a movable wall including a flexible bladder; the movable wall dividing the diaphragm chamber assembly into an upper chamber and a lower chamber; the upper chamber being adjustably pressurized to move the movable wall;
  a push rod extending from each diaphragm chamber assembly for translating movement of the movable wall whereby the push rod is interconnected to the lift axle suspension system in a manner such that translated movement of the push rod causes pivotal movement of the articulating arms and axle attached thereto; and
  an axle connector bracket rigidly affixed to the axle, and the push rod for the first diaphragm chamber assembly being pivotally connected to the mounting bracket and the push rod for the second diaphragm chamber assembly being pivotally connected to the axle connector bracket.

9. A lift axle suspension system for selectively raising a vehicle axle and raising wheel assemblies attached thereto out of engagement with a road surface, the vehicle having a longitudinally extending frame member on either side thereof, said system comprising with respect to each frame member:
  a mounting bracket rigidly affixed to the frame member;
  a first and a second articulating arm each having first and second ends, the first end of each articulating arm being pivotally attached to the mounting bracket, and the second end of each articulating arm being pivotally attached to the axle;
  first and second diaphragm chamber assemblies each having therein a movable wall including a flexible bladder; the movable wall dividing the diaphragm chamber assembly into an upper chamber and a lower chamber; the upper chamber being adjustably pressurized to move the movable wall;
  a push rod extending from each diaphragm chamber assembly for translating movement of the movable wall whereby the push rod is interconnected to the lift axle suspension system in a manner such that translated movement of the push rod causes pivotal movement of the articulating arms and axle attached thereto; and
  an axle connector bracket rigidly affixed to the axle and including a first pair of spaced apart walls in which a first end of the articulating arms are pivotally affixed, and wherein the mounting bracket includes a second pair of spaced apart walls in which a second end of the articulating arms are pivotally affixed.

10. A lift axle suspension system for selectively raising a vehicle axle and raising wheel assemblies attached thereto out of engagement with a road surface, the vehicle having a longitudinally extending frame member on either side thereof, said system comprising with respect to each frame member;
  articulating means pivotally attaching the axle to the vehicle; the articulating means including first and second articulating arms;
  a mounting bracket rigidly affixed to the frame member;
  the articulating means being pivotally attached to the mounting bracket via a pivotal attachment of each of the articulating arms;
  a pair of diaphragm chamber assemblies each including upper and lower chambers divided by a pressure sensitive movable wall comprising a flexible bladder;
  a push rod affixed to the movable wall for translating movement of the movable wall;
  a pivot arm pivotally connected to a distal end of each push rod whereby the pivot arms are pivotally connected together about one of the pivotal attachments of the articulating arms to the mounting bracket; and
  each diaphragm chamber assembly including an air inlet for pressurizing the upper chamber which forces the flexible bladder toward the lower chamber thereby pushing the push rod to pivotally move the articulating means and axle attached thereto.

11. The lift axle suspension system of claim 10 wherein the first diaphragm chamber assembly is rigidly mounted to pivotally mounted first articulating arm, while the second diaphragm chamber assembly is rigidly mounted to the mounting bracket.

12. The lift axle suspension system of claim 10 wherein the first and second articulating arms include extensions extending beyond the pivotal connection of the articulating arms to the mounting bracket and in a direction generally opposite the articulating arm direction toward the axle connection, and where the first and second articulating arms are pivotally connected respectively via the extensions to the pivot arm.

13. The lift axle suspension system of claim 12 wherein the first diaphragm chamber assembly is rigidly mounted to the mounting bracket while the second diaphragm chamber assembly is rigidly mounted to the pivot arm.

14. A lift axle suspension system for selectively raising a vehicle axle and raising wheel assemblies attached thereto out of engagement with a road surface, the vehicle having a longitudinally extending frame member on either side thereof, said system comprising with respect to each frame member:

articulating means pivotally attaching the axle to the vehicle;

mounting means rigidly affixed to the frame member;

the articulating means being pivotally attached to the mounting means;

first and second diaphragm chamber assemblies each including upper and lower chambers divided by a pressure sensitive movable wall comprising a flexible bladder; the first diaphragm chamber is assembly being mounted in a pivotal manner while the second diaphragm chamber assembly is mounted in a fixed manner;

a push rod affixed to the movable wall for translating movement of the movable wall; and each diaphragm chamber assembly including an air inlet for pressurizing the upper chamber which forces the flexible bladder toward the lower chamber thereby pushing the push rod, which is interconnected to the articulating means in a manner such that translating movement of the push rod causes pivotal movement of the articulating means and axle attached thereto.

15. A lift axle suspension system for selectively raising a vehicle axle and raising wheel assemblies attached thereto out of engagement with a road surface, the vehicle having a longitudinally extending frame member on either side thereof, said system comprising with respect to each frame member;

articulating means pivotally attaching the axle to the vehicle; the articulating means including a pair of articulating arms;

a mounting bracket rigidly affixed to the frame member;

the articulating means being pivotally attached to the mounting means;

first and second diaphragm chamber assembly each including upper and lower chambers divided by a pressure sensitive movable wall comprising a flexible bladder;

a push rod affixed to each movable wall for translating movement of the respective movable wall;

each diaphragm chamber assembly including an air inlet for pressurizing the upper chamber which forces the flexible bladder toward the lower chamber thereby pushing the push rod, which is interconnected to the articulating means in a manner such that translating movement of the push rod causes pivotal movement of the articulating means and axle attached thereto; and a pivot arm with the first and second diaphragm chamber assemblies connected thereto, while the push rod for the first diaphragm chamber assembly is pivotally connected to the mounting bracket and the push rod for the second diaphragm chamber assembly is pivotally connected to one of the articulating arms.

16. The lift axle suspension system of claim 15 wherein the first and second articulating arms include extensions extending beyond the pivotal connection of the articulating arms to the mounting bracket and in a direction generally opposite the articulating arm direction toward the axle connection, and where the first and second articulating arms are pivotally connected to the pivot arm.

17. A method of selectively raising a vehicle axle and wheel assemblies attached thereto out of engagement with a road surface, the vehicle having a longitudinally extending frame member on either side thereof, said method comprising with respect to each frame member:

pressurizing an upper chamber in each of first and second diaphragm chamber assemblies to move a movable wall in each assembly, each movable wall dividing each diaphragm chamber assembly into the upper chamber and a lower chamber;

translating the movement of the movable walls via respective push rods each having an outer end extending respectively from the diaphragm chamber assemblies;

pivoting pivot arms connected respectively to the outer end of each push rod and pivotally connected together;

pivoting first and second articulating arms about a first pivot adjacent a first end of each articulating arm and a second pivot adjacent a second end of each articulating arm to lift the vehicle axle to lift the wheel assemblies out of engagement with the road surface; the articulating arms being pivotally attached via the respective first pivots to a mounting bracket rigidly affixed to the vehicle frame and the articulating arms being pivotally attached via the respective second pivots to the axle.

18. A method of selectively raising a vehicle axle and wheel assemblies attached thereto out of engagement with a road surface, the vehicle having a longitudinally extending frame member on either side thereof, said method comprising with respect to each frame member:

pressurizing an upper chamber in each of first and second diaphragm chamber assemblies to move a movable wall in each assembly, each movable wall dividing each diaphragm chamber assembly into the upper chamber and a lower chamber; the first diaphragm chamber being mounted in a pivotal manner while the second diaphragm chamber is mounted in a fixed manner;

translating the movement of the movable walls via respective push rods each extending respectively from the diaphragm chamber assemblies;

pivoting first and second articulating arms about a first pivot adjacent a first end of each articulating arm and a second pivot adjacent a second end of each articulating arm to lift the vehicle axle to lift the wheel assemblies out of engagement with the road surface: the articulating arms being pivotally attached via the respective first pivots to a mounting bracket rigidly affixed to the vehicle frame and the articulating arms being pivotally attached via the respective second pivots to the axle.

19. The method of claim 18 wherein the first diaphragm chamber assembly is rigidly mounted to the pivotally mounted first articulating arm, while the second diaphragm chamber assembly is rigidly mounted to the mounting bracket.

20. A method of selectively raising a vehicle axle and wheel assemblies attached thereto out of engagement with a road surface, the vehicle having a longitudinally extending frame member on either side thereof, said method comprising with respect to each frame member:

pressurizing an upper chamber in each of a pair of diaphragm chamber assemblies to move a movable wall in each assembly, each movable wall dividing each diaphragm chamber assembly into the upper chamber and a lower chamber;

translating the movement of the movable walls via respective push rods each extending respectively from the diaphragm chamber assemblies;

pivoting first and second articulating arms about a first pivot adjacent a first end of each articulating arm and a second pivot adjacent a second end of each articulating arm to lift the vehicle axle to lift the wheel assemblies out of engagement with the road surface; the articulating arms being pivotally attached via the respective first pivots to a mounting bracket rigidly affixed to the vehicle frame and the articulating arms being pivotally attached via the respective second pivots to the axle; the first and second articulating arms including extensions extending beyond the respective first pivots in a direction generally opposite the arm direction toward the axle connection, and where the first and second articulating arms are pivotally connected respectively via the extensions to a pivot arm.

21. The method of claim 20 wherein the first diaphragm chamber is rigidly mounted to the mounting bracket while the second diaphragm chamber is rigidly mounted to the pivot arm.

22. A method of selectively raising a vehicle axle and wheel assemblies attached thereto out of engagement with a road surface, the vehicle having a longitudinally extending frame member on either side thereof, said method comprising with respect to each frame member:

pressurizing an upper chamber in each of a pair of diaphragm chamber assemblies to move a movable wall in each assembly, each movable wall dividing each diaphragm chamber assembly into the upper chamber and a lower chamber; the first and second diaphragm chamber assemblies being connected to a pivot arm;

translating the movement of the movable walls via respective push rods each extending respectively from the diaphragm chamber assemblies;

pivoting first and second articulating arms about a first pivot adjacent a first end of each articulating arm and a second pivot adjacent a second end of each articulating arm to lift the vehicle axle to lift the wheel assemblies out of engagement with the road surface; wherein the articulating arms are pivotally attached via the respective first pivots to a mounting bracket rigidly affixed to the vehicle frame and the articulating arms are pivotally attached via the respective second pivots to the axle; and wherein the push rod for the first diaphragm chamber is pivotally connected to the mounting bracket and the push rod for the second diaphragm chamber is pivotally connected to one of the articulating arms.

23. The method of claim 22 wherein the first and second articulating arms include extensions extending beyond the respective first pivots in a direction generally opposite the articulating arm direction toward the axle connection, and where the first and second articulating arms are pivotally connected respectively via the extensions to the pivot arm.

24. A method of selectively raising a vehicle axle and wheel assemblies attached thereto out of engagement with a road surface, the vehicle having a longitudinally extending frame member on either side thereof, said method comprising with respect to each frame member:

pressurizing an upper chamber in each of first and second diaphragm chamber assemblies to move a movable wall in each assembly, each movable wall dividing each diaphragm chamber assembly into the upper chamber and a lower chamber;

translating the movement of the movable walls via respective push rods each extending respectively from the diaphragm chamber assemblies;

pivoting first and second articulating arms about a first pivot adjacent a first end of each articulating arm and a second pivot adjacent a second end of each articulating arm to lift the vehicle axle to lift the wheel assemblies out of engagement with the road surface; the articulating arms being pivotally attached via the respective first pivots to a mounting bracket rigidly affixed to the vehicle frame and the articulating arms being pivotally attached via the respective second pivots to the axle; the push rod for the first diaphragm chamber assembly being pivotally connected to the mounting bracket and the push rod for the second diaphragm chamber assembly being pivotally connected to the an axle connector bracket rigidly affixed to the axle.

25. A lift axle suspension system for selectively raising a vehicle axle and raising wheel assemblies attached thereto out of engagement with a road surface, the vehicle having a longitudinally extending frame member on either side thereof, said system comprising with respect to each frame member:

a mounting bracket rigidly affixed to the frame member;

first and second articulating arms each having first and second ends, the first end of each articulating arm being pivotally attached to the mounting bracket, and the second end of each articulating arm being pivotally attached to the axle;

a pair of diaphragm chamber assemblies each having therein a movable wall including a flexible bladder; the movable wall dividing the diaphragm chamber assembly into an upper chamber and a lower chamber; the upper chamber being selectively pressurized to move the movable wall; at least one of the diaphragm chamber assemblies being mounted in a movable manner;

a push rod extending from each diaphragm chamber assembly for translating movement of the movable wall whereby the push rod causes pivotal movement of the articulating arms and axle attached thereto.

26. The system of claim 25 wherein one of the diaphragm chamber assemblies is mounted in a movable manner and the other diaphragm chamber assembly is mounted in a fixed manner.

27. The system of claim 26 wherein each articulating arm includes an extension which extends beyond the pivotal attachment of the articulating arm to the mounting bracket in a direction generally away from the second end of the articulating arm; and wherein the movable diaphragm chamber assembly is mounted to a pivot arm which is pivotally mounted to each of the articulating arm extensions.

28. The system of claim 25 wherein both diaphragm chamber assemblies are mounted in a movable manner.

29. The system of claim 28 wherein the diaphragm chamber assemblies are mounted to a pivot arm which is pivotally mounted to each of the articulating arms.

30. The system of claim 28 wherein the diaphragm chamber assemblies suspended by the push rods.

31. The system of claim 28 wherein the diaphragm chamber assemblies are rigidly attached to one another.

32. The system of claim 31 wherein each articulating arm includes an extension which extends beyond the pivotal attachment of the articulating arm to the mounting bracket in a direction generally away from the second end of the articulating arm; and wherein one of the push rods is pivotally mounted to the mounting bracket and the other push rod is pivotally mounted to one of the articulating arm extensions.

33. The system of claim 31 wherein one of the push rods is pivotally mounted to the mounting bracket and the other push rod is pivotally mounted to an axle connector bracket rigidly affixed to the axle.

34. The system of claim 25 wherein each articulating arm includes an extension which extends beyond the pivotal attachment of the articulating arm to the mounting bracket in a direction generally away from the second end of the articulating arm; and wherein one of the push rods is pivotally mounted to one of the articulating arm extensions.

35. The system of claim 34 wherein at least one of the diaphragm chamber assemblies is mounted to a pivot arm which is pivotally attached to each of the articulating arm extensions.

36. The system of claim 35 wherein the diaphragm chamber assemblies are rigidly mounted to one another.

37. The system of claim 25 wherein one of the push rods is pivotally mounted to the mounting bracket and the other push rod is pivotally mounted to an axle connector bracket rigidly affixed to the axle.

38. The system of claim 37 wherein the diaphragm chamber assemblies are rigidly mounted to one another.

39. The system of claim 38 wherein the diaphragm chamber assemblies suspended by the push rods.

* * * * *